US006996800B2

(12) United States Patent
Lucassen et al.

(10) Patent No.: US 6,996,800 B2
(45) Date of Patent: Feb. 7, 2006

(54) MVC (MODEL-VIEW-CONTROLLER) BASED MULTI-MODAL AUTHORING TOOL AND DEVELOPMENT ENVIRONMENT

(75) Inventors: John M. Lucassen, Katonah, NY (US); Stephane H. Maes, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 470 days.

(21) Appl. No.: 10/007,037

(22) Filed: Dec. 4, 2001

(65) Prior Publication Data

US 2003/0023953 A1  Jan. 30, 2003

Related U.S. Application Data

(60) Provisional application No. 60/251,085, filed on Dec. 4, 2000.

(51) Int. Cl.
  G06F 9/44  (2006.01)
(52) U.S. Cl. .................................. 717/106; 717/104
(58) Field of Classification Search ........ 717/106–109, 717/104–105; 715/513
  See application file for complete search history.

(56) References Cited

U.S. PATENT DOCUMENTS 6,088,675 A * 7/2000 MacKenty et al. ......... 704/270
6,493,758 B1 * 12/2002 McLain ....................... 709/227
6,609,246 B1 * 8/2003 Guhr et al. .................. 717/103
6,643,652 B2 * 11/2003 Helgeson et al. ............ 707/10
2002/0194388 A1 * 12/2002 Boloker et al. ............. 709/310
2003/0046316 A1 * 3/2003 Gergic et al. ............... 707/513

FOREIGN PATENT DOCUMENTS

EP  1 100 013 A2 * 5/2001

OTHER PUBLICATIONS

U.S. Appl. No. 09/544,823, filed Apr. 6, 2000, entitled *Methods and Systems for Multi-Modal Browsing and Implementation of a Conversational Markup Language*.
U.S. Appl. No. 09/507,526, filed Feb. 18, 2000, entitled *Systems and Methods for Synchronizing Multi-Modal Interactions*.

* cited by examiner

*Primary Examiner*—Wei Y. Zhen
(74) *Attorney, Agent, or Firm*—Frank V. DeRosa; F. Chau & Associates, LLC

(57) ABSTRACT

Application development tools and method for building multi-channel, multi-device and multi-modal applications, and in particular, to systems and methods for developing applications whereby a user can interact in parallel with the same information via a multiplicity of channels and user interfaces, while a unified, synchronized views of the information are presented across the various channels or devices deployed by the user to interact with the information. In a preferred embodiment, application frameworks and development tools are preferably based on a MVC (Model-View-Controller) design paradigm that is adapted to provide synchronized multi-modal interactions. Multi-channel authoring can be developed using a similar methodology.

14 Claims, 7 Drawing Sheets

Tiers positioning with respect to MVC paradigm and single authoring programming model

MVC (MODEL-VIEW-CONTROLLER) BASED MULTI-MODAL AUTHORING TOOL AND DEVELOPMENT ENVIRONMENT

CROSS-REFERENCE TO RELATED APPLICATION

This application is based on U.S. Provisional Application Ser. No. 60/251,085, filed on Dec. 4, 2000, which is fully incorporated herein by reference.

BACKGROUND

The present invention relates generally to systems and methods for building multi-channel, multi-device, and multi-modal user interfaces and applications, and in particular, to systems and methods for enabling multi-modal interactions using a MVC (Model-View-Controller) framework that enables a user to reuse existing channel-specific authoring tools and interact in parallel with the same information via a multiplicity of channels, devices, and/or user interfaces, while presenting a unified, synchronized view of such information across the various channels, devices and/or user interfaces.

The computing world is evolving towards an era where billions of interconnected pervasive clients will communicate with powerful information servers. Indeed, this millennium will be characterized by the availability of multiple information devices that make ubiquitous information access an accepted fact of life. This evolution towards billions of pervasive devices being interconnected via the Internet, wireless networks or spontaneous networks (such as Bluetooth and Jini) will revolutionize the principles underlying man-machine interaction. In the near future, personal information devices will offer ubiquitous access, bringing with them the ability to create, manipulate and exchange any information anywhere and anytime using interaction modalities most suited to the an individual's current needs and abilities. Such devices will include familiar access devices such as conventional telephones, cell phones, smart phones, pocket organizers, PDAs and PCs, which vary widely in the interface peripherals they use to communicate with the user.

The increasing availability of information, along with the rise in the computational power available to each user to manipulate this information, brings with it a concomitant need to increase the bandwidth of man-machine communication. The ability to access information via a multiplicity of appliances, each designed to suit the individual's specific needs and abilities at any given time, necessarily means that these interactions should exploit all available input and output (I/O) modalities to maximize the bandwidth of man-machine communication. Indeed, users will come to demand such multi-modal interaction in order to maximize their interaction with information devices in hands-free, eyes-free environments.

The current networking infrastructure is not configured for providing seamless, multi-modal access to information. Indeed, although a plethora of information can be accessed from servers over a communications network using an access device (e.g., personal information and corporate information available on private networks and public information accessible via a global computer network such as the Internet), the availability of such information may be limited by the modality of the client/access device or the platform-specific software applications with which the user is interacting to obtain such information.

By way of example, one of the most widely used methods for accessing information over a communications network is using a conventional HTML browser to access information over the WWW (world wide web) using, for example, portals such as Yahoo! and AOL. These portals typically include a directory of Web sites, a search engine, news, weather information, e-mail, stock quotes, etc. Typically, only a client/access device having full GUI capability can take advantage of such Web portals for accessing information.

Other conventional portals and access channels include wireless portals/channels that are typically offered by telephone companies or wireless carriers (which provide proprietary content to subscribing users and/or access to the Internet or a wireless portion of the Internet, with no restrictions or access control). These wireless portals may be accessed via WAP (wireless application protocol) by client/access devices (via a WAP browser) having limited GUI capabilities declaratively driven by languages such as WML (wireless markup language), XHTML (extensible hypertext markup language) Mobile Profile or CHTML (compact hypertext markup language) such as NTT DocoMo imode). WAP with WML and XHTML-MP and iMode with CHTML allow a user to access the Internet over a cellular phone with constrained screen rendering and limited bandwidth connection capabilities. Currently, wireless portals do not offer seamless multi-modal access (such as voice and GUI) regardless of the access device. Instead, a separate voice mode is used for human communication and a separate mode is used for WAP access and WML browsing.

In addition, IVR services and telephone companies can provide voice portals having only speech I/O capabilities. The IVR systems may be programmed using, e.g., proprietary interfaces (state tables, scripts beans, etc.) or VoiceXML (a current speech ML standard) and objects. With a voice portal, a user may access an IVR service and perform voice browsing using a speech browser (or using telephone key pads). Unfortunately, a client/access device having only GUI capability would not be able to directly access information from a voice portal. Likewise, a client/access device having only speech I/O would not be able to access information in a GUI modality.

Currently, new content and applications are being developed for Web accessibility with the intent of delivering such content and application via various channels with different characteristics, wherein the content and applications must be adapted to each channel/device/modality. These "multi-channel applications" (an application that provides ubiquitous access through different channels (e.g., VoiceXML, HTML), one channel at a time) do not provide synchronization or coordination across views of the different channels.

One challenge of multi-channel applications/content is that since new devices and content emerge continuously, this adaptation must be made to work for new devices not originally envisioned during the development process. In addition, it is important to be able to adapt existing content that may not have been created with this multi-channel or multi-modal deployment model in mind.

Further disadvantages of multi-channel applications is that, notwithstanding that multi-channel applications enable access to information through any device, it is difficult to enter and access data using small devices since keypads and screens are tiny. Further, voice access is more prone to errors and voice output is inherently sequential. One interaction mode does not suit all circumstances: each mode has its pros and cons. One optimal interaction mode at a moment can no more be optimal at another moment or for another user.

All-in-one devices are no panacea, and many different devices will coexist. In fact, no immediate relief is in sight for making multi-channel e-business easier. Devices are getting smaller, not larger. Devices and applications are becoming more complex requiring more complex or efficient user interfaces. Adding color, animation, streaming, etc. does not simplify the e-business issues mentioned above. Considering these factors leads to the conclusion that an improved user interface will accelerate the growth of mobile e-business.

Accordingly, systems and methods for building and implementing user interfaces an applications that operate across various channels and information appliances, and which allow a user to interact in parallel with the same information via a multiplicity of channels and user interfaces, while presenting a unified, synchronized view of information across the various channels, are highly desirable. Indeed, there will be an increasingly strong demand for devices and browsers that present the same set of functionalities when accessing and manipulating the information, independently of the access device. The resulting uniform interface should be inherently multi-modal and dialog driven.

SUMMARY OF THE INVENTION

The present invention is directed to systems and methods for building multi-channel, multi-device and multi-modal user interfaces, applications and development tools, and in particular, to systems and methods for developing multi-modal interactions whereby a user can interact in parallel with the same information via a multiplicity of channels and user interfaces, while a unified, synchronized views of the information are presented across the various channels or devices deployed by the user to interact with the information. In a preferred embodiment, application frameworks and development tools are preferably based on a MVC (Model-View-Controller) design paradigm that is adapted to provide synchronized multi-modal interactions. Multi-channel authoring can be developed using a similar methodology.

In one aspect of the present invention, an application development tool is preferably based on a MVC (Model-View-Controller) framework, wherein a single information source, Model M (comprising a modality-independent representation of an application) is mapped to a plurality of Views (e.g., different synchronized channels) and manipulated via a plurality of Controllers C1, C2 and C3 (e.g., different browsers such as a speech browser, a GUI browser and a multi-modal browser or different devices). The Controllers act on, transform and manipulate the same underlying Model M to provide synchronized Views. The synchronization of the Views is achieved by generating all Views from, e.g., a single unified representation that is continuously updated.

In another aspect, the Model represents the conversation/dialog associated with the application, which is independent of the rendering modality, and comprises a repository of the current dialog state, the dialog state as currently known by the application and the whole conversation history and context. Any user interactions within a modality will act on the conversation Model before being reflected on the different Views.

In another aspect of the present invention, a MVC framework supports a programming Model that is based on a single authoring framework or a multiple authoring framework. Preferably, the single authoring framework comprises a separate interaction logic layer that encapsulates interaction logic in a modality-independent framework, a separate data model layer for data items that are populated by the user interaction and a customization layer for altering a feature of a given view. The authoring of each view that affects the interaction logic layer and contributes an associated customization comprises a useful multi-channel authoring approach and tool.

In another aspect of the present invention, a MVC-based development system is provided for building multi-modal applications. An application development tool comprises a plurality of modality-specific editors for generating one or more modality-specific representations of an application; a model generator for generating a modality-independent representation from a modality-specific representation and for generating a modality-specific representation from the modality-independent representation; and a plurality of rendering units for rendering corresponding modality-specific representations for view by a user.

These and other aspects, features, and advantages of the present invention will become apparent from the following detailed description of the preferred embodiments, which is to be read in connection with the accompanying drawings.

DETAILED DESCRIPTION OF PREFERRED EMBODIMENTS

Figure 1:
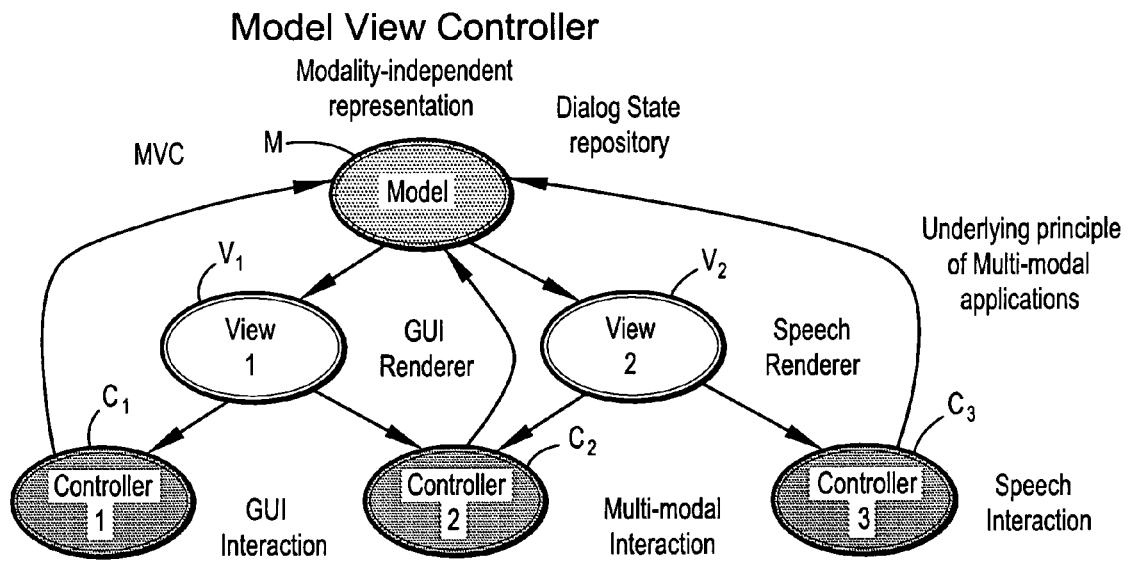
FIG. 1 is a diagram illustrating a MVC framework according to an embodiment of the present invention for building an application or user interface.

The present invention is directed to systems and methods for building user interfaces and applications using a MVC (Model-View-Controller) paradigm for authoring and development tools. An MVC-based multi-modal authoring tool and development environment according to the present invention enables the design and construction of user interfaces and applications that work across a multiplicity of information appliances. Indeed, a MVC-based authoring tool allows a user to interact in parallel with the same information via a multiplicity of channels, devices and/or user interfaces, while presenting a unified, synchronized view of information across the various channels, devices, and/or user interfaces deployed by the user to interact with such information. An MVC-based authoring tool allows a user to edit in one (or multiple channel specific view), which results in an update of the interaction logic layer which is then adapted for the different views to see the impact on other channels. An MVC-based authoring tool according to the present invention enables authoring of multi-channel (non synchronized), multi-modal (synchronized simultaneously or sequentially) or multi-device (synchronized simultaneously or sequentially) applications. The tool output can be (i) the interaction logic layer with possibly customization meta-data, (ii) a functional or customized presentation for a given channel/delivery context, or (iii) a multiple authored multi-modal application as any of the multiple authoring approaches described herein. An advantage of outputting the presentation for particular channel is that it enables the capability to cache/pre-generate the presentation at least for key channels.

An authoring tool according to the present invention also allows the generation of JSPs, struts and other efficient server-side mechanisms to generate the presentation (CGI, Servlets, JSP beans, ASPs, struts, . . . ) executed in a programming language—environment (Java, Perl, Python, PHP, C, VisualBasic, . . . ). Multiple authoring output (for example with a XHTML voice module or naming convention) is an efficient mechanism to generate such server side generators of multi-modal presentation while eliminating a transcending step at runtime. For non-precompiled channels, the runtime will adapt the interaction logic layer with customization meta-data (via transcending) (and possibly synchronize) or the output is a JSP, struts (or others server-side processing) of the interaction logic layer and customization. That dynamically generates an interaction logic layer and customization which is then adapted at runtime.

The following detailed description of preferred embodiments is divided into the following sections for ease of reference. Section I below provides a general description of features and functionalities of a multi-modal system (browser, user interface, etc.) according to the present invention, as well as the need, motivation and advantages of implementing programming environments and development tools for multi-modal user interfaces for e-business. This implementation can be used as runtime for execution of the multi-modal application. In addition, it can be used as a simulator of the multi-modal browser at authoring to see/check and debug the application. Each view is also a simulator of each target channel for multi-channel applications. Section II describes preferred embodiments of a MVC architecture which is preferably used for implementing a multi-modal system such as an application development tool. Section III describes various programming models that may be employed with a MVC framework according to the present invention, wherein section III(A) describes single authoring programming paradigms and section III(B) describes multiple authoring programming paradigms. Section IV describes application authoring and development tools and environments according to the present invention, which are based on a MVC paradigm. And section V describes an exemplary e-business scenario to illustrate advantages of the present invention.

The term "channel" used herein refers to a particular renderer, device, or a particular modality. A "delivery context" defined as a set of attributes that characterizes the capabilities of the access mechanism and the preferences of the user. Examples of different modalities/channels include speech such as VoiceXML, visual (GUI) such as HTML (hypertext markup language), restrained GUI such as WML (wireless markup language), CHTML (compact HTML), XHTML-MP and HDML (handheld device markup language) or any combination of such modalities.

The term "multi-channel application" refers to an application that provides ubiquitous access through different channels (e.g., VoiceXML, HTML), one channel at a time. Multi-channel applications do not provide synchronization or coordination across the views of the different channels. Each channel specific presentation can be functional or customized with the following definitions. The term presentation layer refers to the information transmitted to the user agent where it is rendered to the user as a collection of physical effects, visual, auditory or tactile, via one or more devices within the access mechanism. Mechanical controls, such as buttons, keys and pointers, and sonic input such as voice commands, for example, allow a user to interact with the presentation page. Functional presentation refers to a presentation that enables the user to complete, via a given access mechanism, the function intended by the author for the given Web page identifier. Customized presentation refers to a functional presentation of a Web page that is well enough adapted to a given delivery context to meet the quality criteria of the author.

The term "multi-modal" application refers to multi-channel applications, wherein multiple channels are simultaneously available and synchronized. Furthermore, from a multi-channel point of view, multi-modality can be considered another channel.

Furthermore, the term "conversational" or "conversational computing" as used herein refers to seamless multi-modal dialog (information exchanges) between user and machine and between devices or platforms of varying modalities (I/O capabilities), regardless of the I/O capabilities of the access device/channel, preferably, using open, interoperable communication protocols and standards, as well as a conversational (or interaction-based) programming model that separates the application data content (tier 3) and business logic (tier 2) from the user interaction and data model that the user manipulates. The term "conversational application" refers to an application that supports multi-modal, free flow interactions (e.g., mixed initiative dialogs) within the application and across independently developed applications, preferably using short term and long term context (including previous input and output) to disambiguate and understand the user's intention. Conversational application preferably utilize NLU (natural language understanding).

I. Motivation For Employing Multi-Modal Framework for E-business

A Multi-modal application development and authoring tools according to the present invention are particularly advantageous for use with the Mobile Internet. Indeed, a value proposition for e-business solutions is to employ multi-modal applications/user interfaces/devices according to the present invention that allow users to: (i) enter and access data easily using small mobile devices (since, e.g., talking is easier than typing and reading is faster than listening); (ii) choose the interaction mode that suits the task and circumstances (e.g., input: key, touch, stylus, voice, output: display, tactile, audio, etc.); and to (iii) utilize several devices in combination (to thereby take advantage of the unique capabilities of each device). A multi-modal interfaces according to the present invention provides seamless user interaction with multiple channels and devices. Indeed, it is expected that the mobile Internet will readily adopt user interfaces and applications that enable multiple, coordinated information channels—running either on the same or multiple devices or middleware—to be used simultaneously to gain sequential or parallel information access.

A multi-modal user interface according to the present invention makes it possible to choose the optimal interaction mode for each interaction between a user and an application. For example, stock charts or maps are more easily viewed as images, while complex queries are more effectively entered by voice. The choice of a particular interaction mode can be made by the developer of the application, or it can be left up to the user. For example, even if an interaction might be most effectively conducted via voice, a user may prefer to use stylus input if there are other people in the room. Similarly, even if an interaction is well-suited for a visual display and touch input, a user may prefer to use voice when his hands and eyes are busy. And a user who is interacting with an application by voice, say trying to arrange a flight while walking, may stop walking in order to interact visually when reaching a certain point in the application where he knows or feels that visual interaction is faster. It is also possible that the modality to be used is imposed by the author (that author of the application allows only one modality/channel and/or prevents its presentation in other views (customization).

A multi-modal system according to the present invention improves user interaction by allowing multiple, coordinated information channels—running either on the same or multiple devices or middleware—to be used simultaneously to gain sequential or parallel information access. A multi-modal framework according to the present invention provides a mechanism for parallel use of multiple access channels whereby transactions are shared across different devices. In addition, mechanisms are provided whereby updates to the underlying information via any given device or interface is immediately reflected in all available views of the information. A multi-modal system provides such coordinated, parallel user interaction by maintaining and utilizing shared application context and history, which enables all participating channels to share equally in the conversation with the user. The different channels provide similar and equivalent functionality while ensuring that the user is presented with consistent views of the underlying information that is being manipulated. In addition, interaction context and history is preferably synchronized across the various channels or devices so as to enable seamless transitions in the user interaction amongst the various channels or devices. Thus, user interaction with a specific device is reflected across all available channels; conversely, each available channel is primed to carry on the conversation with the user where a previously active device leaves off. This is closely related to the issues of suspend and resume capabilities (transactional persistence and sequential multi-modal/multi-device) that for example enables a transaction performed on a PC to be interrupted and continued soon after by voice or WAP over a cell phone.

A multi-modal framework according to the present invention is applicable to multi-device applications and multi-channel applications and there is no fundamental difference in the mechanisms for multiple devices and multiple modalities. The synchronized and coordinated use of multiple devices in parallel will be especially important among pervasive clients. Today, users juggle between cell phones, pagers, PDAs and laptops. Synchronization mechanisms are provided but they merely guarantee that part of the information is shared and kept up to date across the devices. Authoring tools according to the present invention are preferably implemented for building multi-channel, multi-modal, multi-device and conversational applications.

An underlying principle of the present invention is that a user participates in a conversation with various available information channels all of which communicate with a common information backend to manipulate a single synchronized model. The different participants in the conversation—including the user—will use the most appropriate modality to communicate with the target of the current portion of the conversation. Notice that when phrased as above, the role of the user and the various devices participating in the conversation is symmetric—a user can choose to point or use other visual gestures to interact with a particular device while using spoken commands to direct other portions of the conversation. The multi-modal interface driving the various devices can equivalently choose to display certain information visually while speaking other aspects of the conversation.

Key aspects of this form of interaction include the ability of the system to use the best possible combination of interface modalities based on the user's current preferences, needs and abilities as well as the application requirements and device capabilities. At the same time, the system is characterized by the ability to dynamically update its choice of modalities based on what the user chooses to do. Thus, upon failure of the user to respond to a spoken prompt, the system might choose to revert to a visual interface—an implicit assumption that the user is in environment where speech interaction is inappropriate—equivalently, a spoken request from the user might cause the system to update its behavior to switch from visual to spoken interaction.

Thus, an application or user interface that is constructed in accordance with the present invention using mechanisms described herein advantageously support seamless transitions in the user interaction amongst the different modalities available to the user, whether such user interaction is on one or across multiple devices. When appropriate multi-modal user interface middleware becomes available, application developers and users will influence what information and under what preferred form is provided and acted upon in each modality. Automatic adaptation of the applications based on this consideration can be available on the server (application adaptation) or on the connected clients (user preferences, browser rendering features). A user interface according to the present invention supports dynamic and often unpredictable dynamic switches across modalities. Indeed, based on the user's activities and environment, the preferred modality can suddenly change. For example, a speech-driven (or speech and GUI) banking transaction will probably become GUI only if other people enter the room. Transactions that the user could not complete in his office are to be completed in voice only or voice only/GUI constrained mode in the car.

II. Presenting Unified Information Views Via a Model-View-Controller Paradigm

FIG. 1 is a diagram illustrating a preferred programming paradigm for implementing a multi-modal application in accordance with the above-described concepts. A multi-modal application is preferably based on a MVC (model-view-controller) paradigm as illustrated in FIG. 1., wherein a single information source, Model M (e.g., a modality-independent representation of an application) is mapped to a plurality of Views (V1, V2) (e.g., different synchronized channels) and manipulated via a plurality of Controllers C1, C2 and C3 (e.g., different browsers such as a speech browser, a GUI browser and a multi-modal browser). More specifically, with this architecture, a multi-modal system comprises a plurality of Controllers (e.g., C1, C2, and C3) that act on, transform and manipulate the same underlying Model M to provide synchronized Views V1, V2 (i.e., to transform the single Model M to multiple synchronous Views). The synchronization of the Views is achieved by generating all Views from, e.g., a single unified representation that is continuously updated. A single Model M is transformed to multiple synchronous Views. These transformations can be inverted to map specific portions of a given View to the underlying Model M. Assume Ti denotes the mapping of the model M to the View i and $T_1^{-1}$ denotes the inverted mapping, composing Ti using $Ti^{-1}$ for appropriate values of i enables synchronization among the Views.

In other words, an MVC-based multi-modal system such as shown in FIG. 1 enables seamless switches between channels at any time, by continuously maintaining and updating the same state of the dialog in all interacting views, whether such channels comprise different devices or different modalities. A further consequence of the decision to embody multi-modal systems as collections of Controllers all of which manipulate the same underlying Model to provide synchronized Views, is that the system can be local (e.g. fat client) or distributed. This synchronization of Views is a direct consequence of generating all Views from a single unified representation that is continuously updated; the single modality-independent (channel-independent) representation provides the underpinnings for coordinating the various Views.

To see this, consider each View as a transformation of the underlying modality-independent representation and consider that the modality-independent representation is described in XML (declarative case). In this instance, the Model can be viewed as an abstract tree structure that is mapped to channel-specific presentational tree structures. These transformations provide a natural mapping amongst the various Views since any portion of any given View can be mapped back to the generating portion of the underlying modality-independent representation, and this portion consequently mapped back to the corresponding View in a different modality by applying the appropriate transformation rules.

Thus, in one preferred embodiment of the present invention, a multi-modal user interface and architecture follows the MVC paradigm. The existence of a modality independent representation of the application enables implementation of the MVC, where the state of the application in that representation can be considered as the Model of the MVC architecture. More specifically, the Model of the interaction, which is independent of the rendering channel or modality, comprises a repository of the current dialog state, the dialog flow as currently known by the application and the whole conversation history and context when context management is needed. Any user interactions within a modality must act on the conversation Model before being reflected on the different Views.

Other approaches may result in multi-modal dialog inconsistencies: forms completed in multiple modalities may be rejected as incomplete; page navigation in a modality may not reach the same dialog state in the other, etc. These problem can be solved by appropriate authoring of the application however, fixing these inconsistencies, without implementing MVC, requires overhead with numerous round trips to the server, multiple connections between the views or monolithic synchronization authoring. But in the end, these solutions, once fixed, are weak version of MVC.

Alternatively, non-MVC architectures can provide command and control level of capabilities, where a channel can be driven from another channel. It implies that the interaction flow is determined by the controlled channel rather than the channel actually used by the user. Such mismatches typically reduce usability and negatively impact the user experience. However, this does not mean that such solutions are not acceptable under particular conditions or for particular design points. In addition, it should be noted that it is possible to combine a multi-modal shell (model) with one of the views at implementation. Depending on the actual flow of event and view manipulation the MVC architecture is or is not respected. In any case, it is possible to implement other browsing synchronization mechanisms or flows using the MVC architecture that emulates the other browser behavior. This can then be used to simulate the behavior of the multi-modal application with other multi-modal browser architectures.

III. Programming Models for Applications and MVC

It is to be appreciated that an MVC framework such as shown in FIG. 1 can support either single or multiple authoring approaches. An MVC framework according to the present invention can provide different levels of synchronization across the different modalities/channels/devices supported by an application, depending on the limits supported by the authoring method. For instance, a multiple authoring paradigm can support a given level of granularity, whereas a single authoring paradigm can advantageously support any level of synchronization.

A. Single Authoring

An underlying principle of single authoring is the Model-View-Controller, wherein the Model comprises a channel independent description of the application, each channel comprises a View of the model, and the Views are obtained by transforming the model representation into its target form which is rendered by Controllers such as channel specific browsers (e.g. WAP browser (rendering WML or XHTML-MP), Web/HTML browser, C-HTML browser, HDML browser, VoiceXML voice browser, etc . . . ). The user interacts with each View through a browser. Further, as multi-modality can be considered as a particular type of channel, the MVC principle becomes especially relevant for multi-modal or multi-device interactions. The user interacts via the Controller on a given View. Instead of modifying the View, his or her actions update the state of the Model, which results in an update of the different registered Views to be synchronized.

Accordingly, in a preferred embodiment of the present invention, an MVC framework supports single authoring across a large variety of devices and modalities. Assume that "gestures" comprise units of synchronized blocks. For a single authoring method, gestures comprise elementary units defined by the language syntax and for which transformation rules are available for each View (channel). The Model (application) comprises a modality-independent representation that is dynamically transformed into the different channel specific languages. Naming conventions or node identification are associated to each of the resulting elements in each channel. Since any portion of any given View can be mapped back (through the node identification) to the generating portion of the underlying modality-independent representation, and this portion consequently mapped back to the corresponding View in a different modality by applying the appropriate transformation rules, the approach automatically satisfies the MVC principle.

Single authoring is motivated by the need to author, maintain, and revise content for delivery to an ever-increasing range of end-user devices. Generally, in a preferred embodiment, a single authoring programming paradigm enables separation of specific content from the presentation enabling reusable style sheets for default presentation in the final form. Specialization (or "customization") can then be performed in-line or via channel specific style sheets.

Single authoring for delivering to a multiplicity of synchronized target devices and environment provides significant advantages. For instance, as we evolve towards devices that deliver multi-modal user interaction, single authoring enables the generation of tightly synchronized presentations across different channels, without requiring re-authoring of the multi-channel applications. The MVC principle guarantees that these applications are also ready for synchronization across channels.

Such synchronization allows user intent expressed in a given channel to be propagated to all the interaction components of a multi-modal system. Multi-modal systems according to the present invention may be classified as "tightly-coupled" multi-modal interactions or "loosely-coupled" multi-modal interactions where each channel has its own model that periodically synchronizes with the models associated to the other channels. A tightly-coupled solution can support a wide range of synchronization granularities, as well as provide optimization of the interaction by allowing given interactions to take place in the channel that is best suited as well as to revert to another channel when it is not available or capable enough. The same approach can be extended to multi-device browsing whereby an application is simultaneously accessed through different synchronized browsers.

Figure 2:
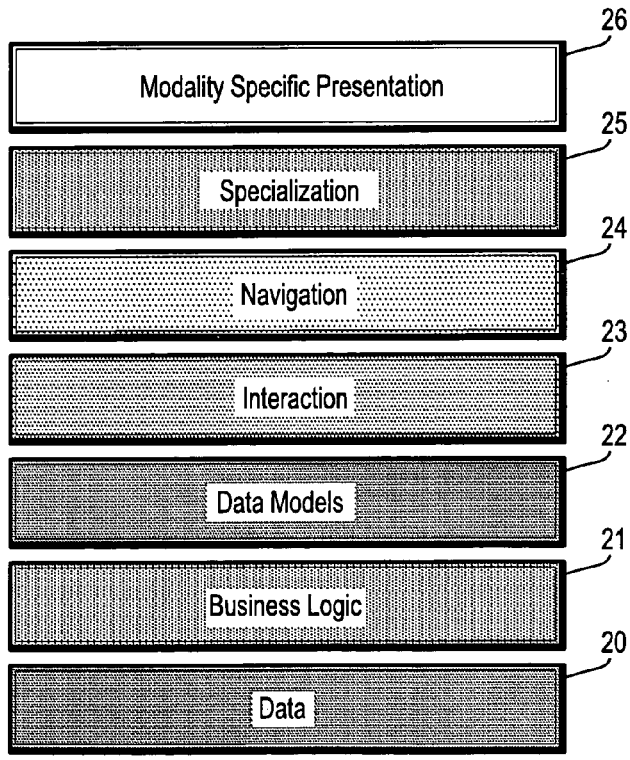
FIG. 2 is a diagram illustrating a programming framework for a single authoring programming paradigm which is preferably used for implementing a MVC-based application or user interface according to the present invention.

In a preferred embodiment of the present invention, an MVC framework implements a single authoring programming framework that separates content, presentation, and interaction. For example, FIG. 2 is a diagram illustrating various programming layers comprising a single authoring programming model for implementing an application. A preferred single authoring model separates various programming layers comprising a backend data layer 20, a business logic layer 21, a data model layer 22, an interaction logic layer 23, a navigation layer 24, a specialization layer 25, and a modality-specific rendering layer 26. The business logic layer 21 is the portion of an application that contains the logic, i.e., encoded set of states and conditions that drive the evolution of the application, as well as variable validation information. In a preferred embodiment, the data models 22 (or data type primitives) are XML Schema compliant and defined in accordance with the proposed WC3 standard XFORMS Data Model (see, e.g., http:///www/w3.org/TR/xforms/). An modality-independent application preferably defines a data model for the data items to be populated by the user interaction, and then declares the user interface that makes up the application dialogues.

The interaction layer 23 abstracts the application in terms of a finite set of interaction primitives (e.g., conversational gestures) to encapsulate the interaction logic in a modality-independent manner. One example of a preferred interaction language referred to as Interaction Markup Language (iML) will be explained in detail below.

The modality-specific presentation of the application as provided by the modality-specific presentation layer 26 is preferably based on the proposed XForms standard of separation of UI from the data models 22 (although the data model can be expressed using other suitable techniques). Lastly, the specialization layer 25 provides a mechanism for cosmetic altering a one or more features of a presentation, in one or more modalities. A default rendering of the conversational gestures depends solely on the gestures and the target modality or channel. This can be achieved via in-line annotations that modify the resulting presentation for a particular channel or by overwriting/cascading the transformation rules (e.g., stylesheets).

Separating content from presentation to achieve content re-use is a widely accepted way of deploying future information on the World Wide Web. In the current W3C architecture, such separation is achieved by representing content in XML that is then transformed to appropriate final-form presentations via XSL transforms. Other transformation mechanisms could be considered (e.g., JSPs and other server-side processing as described above). What is novel with the present invention is the ability to structure the content to achieve presentation re-use as well. A single authoring paradigm is particularly advantageous since in the near future, various embodiments of multi-modal browsers will be distributed. It will therefore be especially advantageous to support adaptation the granularity level of synchronization across the views to the network load or available bandwidth. Adaptation to the user's preferences or browser capabilities can also be supported.

Thus, the Model of an MVC framework according to the present invention preferably implements an application that is represented in a way that is independent of the target channel. Such representation abstractly describes the interaction and the data model that the user manipulates through it. At that level, the application is fully functional, independently of the modality or device where it will be rendered. Dynamic content and backend access to the business logical are conventionally programmed. The application can be transformed into presentations (final form) using default transformation rules that depend only on the target channel. Such presentations are defaults views of the applications adapted to the channel.

The application can now be specialized to specific channels or classes of channels. This can be done in-line or by specializing specific transformation rules. In particular such specialization can address the navigation flow, cosmetic layering and nature of the content finally presented to the user in each channel or channel class. Specialization of a fully functional channel-independent version of the application is a very efficient way to develop and maintain multi-channel applications.

Figure 3:
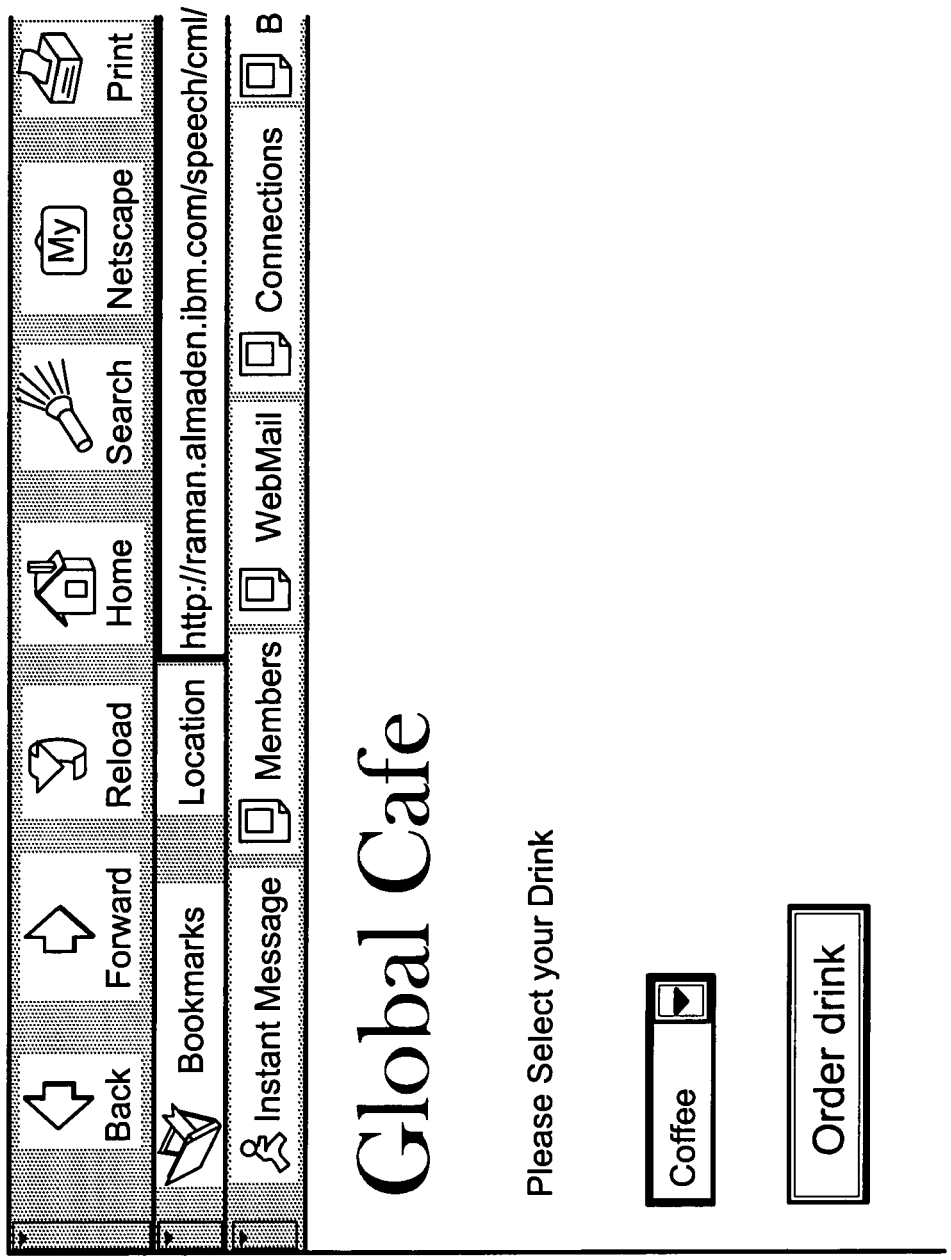
FIG. 3 is an example of a multi-channel application in HTML.

For example, referring now to FIG. 3, consider an application that welcomes a user at a bar (Global Cafe) and offers him or her the capability to order the drink in advance. The simple HTML version of the application is illustrated in FIG. 3. At the level of the interaction layer 23 and data model layer 22 (FIG. 2), the application can be described as: 1) Message to the user (Welcome to the Global cafe), 2) Message to the user (Please Select your drink) 3) Selection from a list (dynamically generated by the backend-business logic and data content; and specified via Xforms) 4) Action: submit (Order Drink). Such description of the application is totally independent of the target channel, but yet fully functional. Default rendering of the interaction in a given channel is only a function of the target channel not the application. For example, the gesture "selection out of a list" can be rendered by default as, e.g., (i) HTML Rendering: Pull Down Menu; (ii) WML: Radio buttons, possibly fragmented over multiple decks of cards; and (iii) VoiceXML: The spoken dialog can be very simple when the whole list is presented to the user for selection. More advanced dialogs with a completely different dialog flow for speech can be provided: "there are 50 items to select from, here are the first three, please say more if you want to hear more", or NLU/free form dialogs (conversational).

The transformations to different modalities can be implemented via XSL style sheets. Clearly this approach supports different dialog flow in each modalities. Further, default rendering can be enhance via a specialization process with in-line specialization (pass-through and gesture extensions, layering, navigation, etc . . . ) or specialization of the transformation rules.

Figure 4:
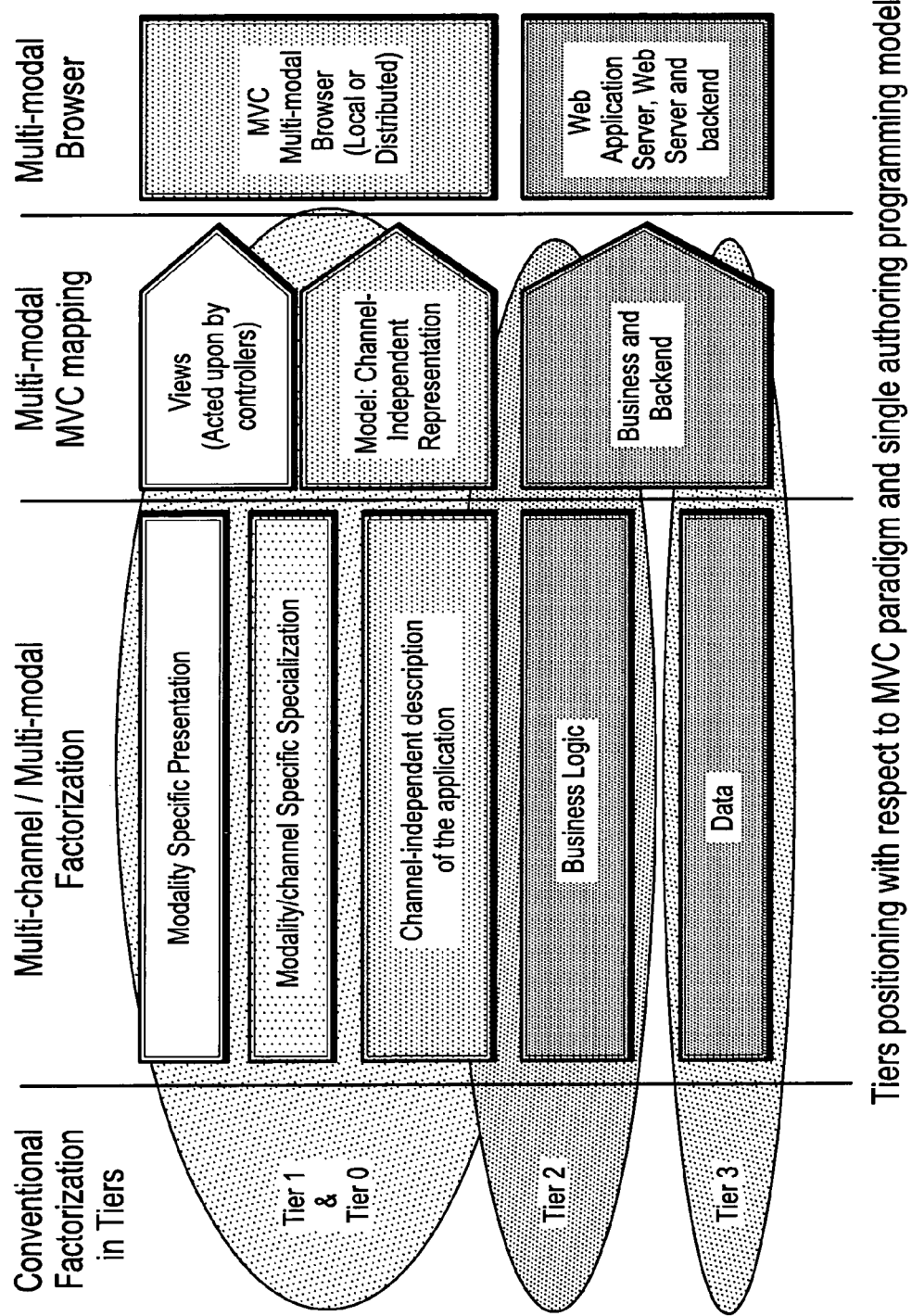
FIG. 4 is a diagram illustrating a relationship between various programming tiers of a MVC framework and single authoring programming model, according to one aspect of the present invention.

An MVC framework according to the present invention is associated with the layer of an application that, in the 3-tier nomenclature, is conventionally called the presentation layer or tier 1 (and sometimes tier 0 when pervasive thin clients are introduced), as illustrated in FIG. 4. In FIG., Tier-3 comprises the database (data) and an application to manage the database. Tier-2 comprises the business logic that runs on a Web application server, Web server, etc., which acts as a server to client requests. It is to be understood that the MVC concept of a modality independent representation of the application assumes that the conventional presentation layer (tier-1 and/or tier 0) is more finely factored and its boundary is somehow moved with respect to Tier 2 the business logic layer. FIG. 4 illustrates this issue, wherein Tier 2 overlaps Tier 1, Tier 0. Depending on the approach and programming methodologies, the correspondence between the various tiers can change.

In FIG. 4, it is assumed that a refinement of the decomposition into more tiers or layers and an implicit programming model for multi-modal applications guarantees the existence of a single modality/channel independent Model. With multiple authoring (as described below), this Model comprises a description of the synchronized blocks and their navigation flow. The Model needs to be extracted from the received ML page(s). Clearly, this Model depends on the type of modalities/channels to synchronize and issues like different prompts in different modalities or elements not addressed in a given modalities are addressed during authoring of the application. With single authoring, the Model describes the data model manipulated by the user and how this manipulation takes place (interaction). In one embodiment, the Model essentially comprises a DOM (Document Object Model) of the received page. This model, up to additional modality specific specializations, does not need to be aware of the type of modalities/channels to synchronize. Issues such as different prompts in different modalities or elements not addressed in a given modalities are taken care of at authoring during the specialization step.

Therefore, there is only one model and it must exist for the application that needs to be synchronized. But as indicated above, it will exist if the application is authored to support synchronization of different channels; by definition. Further, supported modalities do not affect the other tiers except for, e.g., the programming model or methodologies used to develop multi-modal applications and specializations that affect the business logic or data content (e.g. nature of the prompt).

Because there is only one model defined as above, it does not matter at the level of the model that the dialog will be by voice, GUI or a synchronized combination of the two. It will also support any granularity of synchronization from sequential to page level, block level, slot level, event level, merged simultaneously (the synchronization is implicit). Therefore, if the two other tier layers of an application have been developed with this programming model in mind, then none of these layers should be affected either by the modality(ies) used.

So the model is not highly dependent on the used output media, but of course the resulting (synchronized) presentations are. There is only one application across the different tiers but it must be written to fit this programming methodology and the presence of an intermediate model. This can be achieved by various conventional and new approaches. In other words, the application is authored to reflect the differences in terms of the output presented to the user as generated by the 2nd tier for different modalities.

Of course, it is ultimately all a question of definition. If one considers that the Model of an MVC framework according to the present invention comprises the entire application across all tiers, then it could be considered that there is still one Model but it now dynamically adapts its behavior to the channels that it has to support and synchronize. But it is possible to see that as a set of different MVCs. Preferably, this view is not considered since it is preferable to, e.g., decouple a multi-modal browser from the backend tiers to prevent the multi-modal browser architecture from being directly tangled with the rest of the middle ware architecture and bound to middle ware and programming model choices that the web server provider or ASP may make.

A preferred embodiment of an interaction-based programming model that may be implemented in an MVC framework according to the present invention is described, for example, in U.S. patent application Ser. No. 09/544,823, filed on Apr. 6, 2000, entitled: "Methods and Systems For Multi-Modal Browsing and Implementation of A Conversational Markup Language", which is commonly assigned and fully incorporated herein by reference. In general, U.S. Ser. No. 09/544,823 describes a new programming paradigm for an interaction-based iML (interaction markup language) in which the application content (business logic and backend access) is separate from user interaction. More specifically, a iML programming model separates application programming into content aspects, presentation aspects and interaction aspects. Currently, this has been essentially embodied by the user interface portion of the Xforms specifications. The interaction layer may also combine additional event driven navigation (with DOM events, Xlink, XHTML events, event handlers (declarative, scripts or imperative (java, . . . ) etc. . . . ) to enable conditional navigation through the application. Multiple instances of the interaction layer logic can be present (e.g. 2 instances—one for reserving a one way and one for the return reservation). These can be explicitly re-authored as different interactions or loaded as "repeated" instances. This last approach can be done by defining arrays of instance DOM trees. In the tools, the author can navigate between the different instances and possibly pre-set some values for previous instances.

IML preferably comprises a high-level XML-based language for representing "dialogs" or "conversations" between user and machine, which is preferably implemented in a modality-independent, single authoring format using a plurality of "conversational gestures." Conversational gestures comprise elementary dialog components (interaction-based elements) that characterize the dialog interaction with the user and are bound to the data model manipulated by the user. Each conversational gesture provides an abstract representation of a dialog independent from the characteristics and UI offered by the device or application that is responsible for rendering the presentation material. In other words, the conversational gestures are modality-independent building blocks that can be combined to represent any type of intent-based user interaction. A gesture-based IML, for example, allows an application to be written in a manner which is independent of the content/application logic and presentation (i.e., gesture-based IML encapsulates man-machine interaction in a modality-independent manner).

Conversational gestures may be encoded either declaratively (e.g., using XML as indicated above) or imperatively/procedurally. Conversational gestures comprise a single, modality-independent model and can be transformed to appropriate modality-specific user interfaces, preferably in a manner that achieves synchronization across multiple controllers (e.g., speech and GUI browsers, etc.) as the controllers manipulate modality-specific views of the single modality-independent model. Indeed, application interfaces authored using gesture-based IML can be delivered to different devices such as desktop browsers and hand-held information appliances by transcending the device-independent IML to a modality/device specific representation, e.g., HTML, XHTML-MP, WML, or VoiceXML.

In general, user interactions authored in gesture-based IML preferably have the following format:

```
<iml>
    <model id="model_name">.../model>
    <interaction model_ref="model_name" name="name". ...,/interaction.
</iml>
```

The IML document defines a data model for the data items to be populated by the user interaction, and then declares the user interface that makes up the application dialogues. Optionally, the IML document may declare a default instance for use as the set of default values when initializing the user interface. The data items are preferably defined in a manner conformant to XFORMS DataModel and XSchema. The Data models are tagged with a unique id attribute, wherein the value of the id attribute is used as the value of an attribute, referred to herein as model_ref on a given gesture element, denoted interaction, to specify the data model that is to be used for the interaction.

By way of example, the following IML document defines a user interaction for a soda machine:

```
<iml>
    <model id="SodaMachine">
        <string name="command" enumeration="closed">
            <value>drink</value>
            <value>credit</value>
        </string>
        <number name="credit"/>
        <string name = "drink"
                enumeration="dynamic"
                src="http://localhost/servlets/coke-machine/drinks"/>
    </model>
    <interaction name = "SodaMachine"
            model_ref = "sodaMachine">
        <caption>Soda Machine</caption>
        <menu>
            <choices>
                <choice value = "#credit">Insert a coin</choice>
                <choice value = "#drink">Select drink</choice>
            </choices>
        </menu>
        <dialog id= "credit"
            action = "submit">
            <assign name = "SodaMachine.command" expr= "credit"/>
            <input name = "SodaMachine.credit">
                <caption>How much would you like to deposit?</caption>
                <help> You can deposit money into this coke machine—this
                    wil give you credit for obtaining the drink of your choice
                </help>
```

-continued

```
            </input>
        </dialog>
        <dialog id= "drink"
            action= "submit">
            <assign name = "SodaMachine.command" expr= "drink"/>
            <select name = "SodaMachine.drink">
                <caption>What would you like to drink?</caption>
                <help>You can pick one of the available drinks. What would
            you like to drink?
                </help>
            </select>
        </dialog>
        <submit target= "http://localhost/servlets/soda/executeRequest.class">
            <message>Submitting your request to the soda
                machine.
            </message>
        </submit>
```

-continued

```
    </interaction>
</iml>
```

This exemplary iML document first declares a data model for the fields to be populated by the user interaction: the field command is an enumeration of type string with a fixed set of valid values; field drink is an enumeration of type string where the range of valid values is dynamic i.e., determined at runtime; and the field credit of type number is an example of another predefined atomic type number. The element interaction specifies the various portions of the user interaction. The soda machine allows the user to either deposit some money or to pick a drink—these possible user actions are encapsulated in separate conversational gestures. The first gesture within element interaction is a menu that allows the user to pick one of the available actions. Each user action is encapsulated within a separate dialog element that each have an action attribute with value set to submit; upon completion of the gesture, interaction proceeds to gesture submit that is responsible for submitting the expressed user intent to the back-end application.

Navigation within the application is implicit (flow of the gesture and grouping of the gestures) within the interaction logic layer (interaction and data model). Other tools from the XML stack can be used to further specify the navigation: e.g. events (DOM, XHTML) and event handlers (script, declarative or imperative) as well as Xlink to add conditional navigation, etc.

The gesture dialog for the first of the possible user actions obtains a value for field credit from the user. the gesture dialog for selecting a drink uses a select gesture to allow the user to pick one of the available drinks. The list of available choices—like the list of acceptable values for the corresponding enumeration in the data model—is dynamic and is looked up at runtime. The gestures input and select in this example use IML elements caption and help to encapsulate the user prompt and help text. These elements can be further specialized to include modality-specific content where necessary (i.e., specialization).

Customization or specialization is a method for optimizing an application for a given channel (device, modality or browser) or a class of channel (e.g., Nokia cell phones, etc.). For example, specialization may includes providing a background for a page, changing the layering of a page into frames, fragmenting a WML document across multiple deck of cards, specifying the voice characteristics for a TTS prompt or an audio prompt to play back, changing the message to present to the user when spoken versus the displayed message, skipping a gesture not needed in a given modality, etc. This concept is analogous to cosmetized XSL rules for the conversational gestures as described in the above-incorporated U.S. Ser. No. 09/544,823. It can also be implemented by adding in-line annotations that impact the adapted presentation for a particular target channel. Customization may also customize the synchronization or it may customize the navigation flow (e.g. between a free flow and a machine driven dialog). Customization may be performed in various manners. Customization can be used to adapt the abstract representation of the interaction logic into a customized presentation. It could also be seen as an adaptation of a customized presentation for another channel (or functional presentation) into a customized presentation for the target channel. Authoring tools according to the present invention can be used to simulate these two approaches when the author perform customization.

B. Multiple Authoring:

In another embodiment of the present invention, an MVC framework supports a multiple authoring programming model. By way of example, assume that gestures are units of synchronized blocks. For multiple authoring, gestures are the blocks in each modality that are synchronized with one another. Different approaches to synchronization using a multiple authoring paradigm are described for example in U.S. patent application Ser. No. 09/507,526, filed on February 18, entitled: "Systems And Methods For Synchronizing Multi-Modal Interactions", which is commonly assigned and fully incorporated herein by reference.

By way of example, explicit synchronization tags (e.g., co-visit URL tags) may be used which indicate that when reaching this item, a new page must be loaded by the other view. Typically, the synchronization tags delimitate the gestures on the pages. These approaches extend each channel-specific presentation language to add the co-visit tags. Based on the MVC principle discussed above, the synchronization tags should result into an update of the model, followed by an update of all corresponding associated views. Submit result into polling all the views before submitting to the backend.

In another approach to synchronization using naming conventions, the pages in each modality/channel are authored in unmodified channel-specific languages and gestures are defined by re-using appropriate name conventions for the corresponding elements in each channel. Submit result into polling all the views before submitting to the backend. This is the authoring method used for a "loosely" coupled browser.

Another method for synchronization utilizes merged pages, wherein an application is authored by combining snippets from each synchronized modality, re-using unmodified channel specific languages. Gestures are clearly delimitated as combined snippets. If the merged file is parsed in the model, a multi-modal implementation can be obtained by, e.g., shipping well-formatted channel specific snippets pages, one at a time to each view and having the model repository act as a server in between gestures. Submit result into polling all the views before submitting to the backend. Alternatively, multi-modal can be obtained by automatically adding synchronization tags or naming convention and proceed as described above.

A particular example of multiple authoring that merges these different approaches can be implemented as follows. VoiceXML (and other presentation languages) can be modularized to fit XHTML modularization. Accordingly, a single file can comprise snippets associated to a plurality of different views. Synchronization is then explicitly expressed via events in one snippet that triggers event handlers in other corresponding snippets. Events and event handlers can be expressed following the Xlink and XHTML/DOM event syntax. A pseudo data model and interaction logic can then be created as explained above. In addition, because XForms is also a module of XHTML module, it is possible to explicitly introduce a common data model shared across the different views: each snippet also updates the same data model when interacted with (e.g., by explicitly updating it or by throwing an event that the XHTML snippet will catch and process to update the data model). A MVC multi-modal browser can be built relying on this mechanism to update the data model. In that case, it is possible to author via single authoring (e.g. iML/XForms or Xforms UI layer and Xforms data model) and transform it into this VoiceXML/XHTML modules with events and a common data model.

The challenge of authoring for multiple synchronized modalities is closely related to the issues of device-independent authoring and authoring applications to be rendered in different channels (modalities). With multiple authoring of a multi-modal application, content that is targeted at multiple channels can be created by separately authoring the application in each target channel. Alternatively, various style sheet transformations can be authored to transform (via a transcoder) a common representation (device-independent) into the different target presentation languages. Other transformation mechanisms (at authoring (pre-compilation) or runtime) can be used e.g. JSPs. In addition, for multi-modal applications, the developer must also specify the synchronization between the different channels.

With multiple authoring of the target pages, an application composed on M "pages" to be accessed via N devices requires M×N authoring steps and it results into M×N presentation pages to maintain. Generic separation of content from presentation results into non-re-usable style sheets and a similar M×N problem with the style heets. Using an intermediate format with two-step adaptation calls for M+N reusable transformations to be defined. Appropriate definition of a standard common intermediate format allows the M content-to-intermediate authoring steps or transformations—one for each "page"—to be defined by content domain experts while the N intermediate-to-device transformations can be programmed by device experts. Because of the rate at which new devices are becoming available, the system must be able to adapt content for new devices that were not envisioned when the content was created. In addition, it is important to be able to adapt existing content that may not have been created with this multi-channel deployment model in mind.

Multiple authoring is an even more challenging when synchronization is provided across channels. Indeed, with multiple authoring approaches, the application developer must explicitly author where the different channels (or views) of the applications must be synchronized. This can be done by using explicit synchronization tags (co-visit URL tags that indicate that when reaching this item a new page must be loaded by the other view) or merged pages (where the application is authored by combining snippets from each synchronized modality). Besides having strong consequences on the underlying browser architecture, these approaches lead to combinatorial amounts of authoring: between every pair (or more) of channel to synchronize. or whenever a different granularity level of the synchronization is required. Additional authoring steps are also preferred to specify the synchronization if the synchronization is explicitly expressed via events, event handlers and Xlink as described above for a VoiceXML/XHTML module.

Thus, an MVC framework according to the present invention can support both single and multiple programming methods. Further, a single authoring programming model (e.g., a model comprising an interaction and data model layer) is preferred as such a model can provide tight synchronization across various modalities/channels/devices in multi-channel, multi-modal, multi-device and conversational applications. In addition, it implicitly supports the synchronization (from sequential to page level, block level, slot level, event level, merged simultaneously) without requiring any authoring of the synchronization (other than as part of the customization step). Single authoring programming model provides specialization for a class of channels or a specific channel, and can support different navigation flows.

IV. Application Development Environment

The following section discusses preferred programming models and features of multi-channel, multi-modal, multi-device and conversational authoring tools according to the present invention. In a preferred embodiment of the present invention, an application authoring environment is built around a conversational MVC paradigm adapted to authoring tools. Preferably, a single authoring development environment and supporting MVC framework for building multi-channel, multi-modal, multi-device and conversational applications is preferred. Indeed, it is to be appreciated that a single authoring framework allows: (i) content to be created and maintained without presentation concerns; (ii) presentation rules, including content transformations and style sheets, to be maintained for specific channels without adversely affecting other aspects of the system; (iii) content and style to be independently maintained and revised; and (iv) specialization for a specific channel. This separation further provides an advantageous separation of the programming tasks and skills that each channel requires. Based on these advantages associated with a single authoring approach, it is contemplated that a single authoring programming model will be a key component for Web accessibility and other distributed applications.

It is to be appreciated that a single authoring programming model as described herein not limited to declarative programming. Indeed, imperative and hybrid (declarative+scripts and imperative code) models may be implemented that follow the same rules. Typically, such models require the presence of supporting platforms. For example, it is possible to envisage Object components that play the role of the conversational gesture and can be aggregated into channel-independent widgets. Also, it is possible that the interaction logic layer (interaction logic and data model) and customization meta-data be transformed into non-declarative presentations (java applets, beans, portlets, JSPs (JavaSever Pages), ASPs (Active Server Pages), struts, etc . . . ).

In the preferred embodiments described herein, an authoring tool and development environment is based on the authoring of applications that are executed on an interaction manager or multi-modal shell. Preferably, an authoring tool and development environment according to the present invention can build applications that support the following features:

(i) Multi-channel access. Applications should be supported on various access devices in functional form in either GUI, voice or other future modalities. Moreover, such applications should preferably be available in customized form on as many access devices and modalities as possible.

(ii) Suspend and resume that can be separated into Session persistence and sequential multi-modal. Users should be able to suspend an application during the course of a session, and resume the application at a later time. Application sessions are preferably persistent across devices/modality, i.e., sessions can be suspended on one device or in one modality and resumed on another device or modality. The system should be able to provide any granularity of persistence. This functionality can be imposed by the author or left to the dynamic choice of the user.

(iii) Multi-device/Multi-modal interaction. A user should be able to simultaneously interact with an application running on multiple devices, in multiple modalities. The interactions in different modalities are preferably synchronized with each other. Alternatively, portions of a single application can run on multiple devices/modalities in a synchronized manner. Different level of synchronization are preferably supported ranging from author imposed to sequential, page level, block and slot level, event level and simultaneous events.

(iv) Discovery and binding. Applications running on multiple devices that need to coordinate with each other are preferably able to opportunistically discover each other, negotiate their roles, bind with each other, and unbind gracefully. Moreover, applications are preferably able to define preferred bindings and configurations.

(v) Server-initiated client manipulation. The interaction server can preferably manipulate the application interface state on a particular channel, e.g., as a result of external events or authored event handlers.

(vi) Dialog management. A user can preferably carry on multiple concurrent interaction modules and switch freely among them (within and across applications).

A. Interaction Logic Framework

The following describes an interaction-based programming framework according to an embodiment of the present invention. In general, a preferred programming framework is based on interaction logic and customization meta-information. An exemplary embodiment is the programming by interaction using iML and Xforms are described above.

Figure 5:
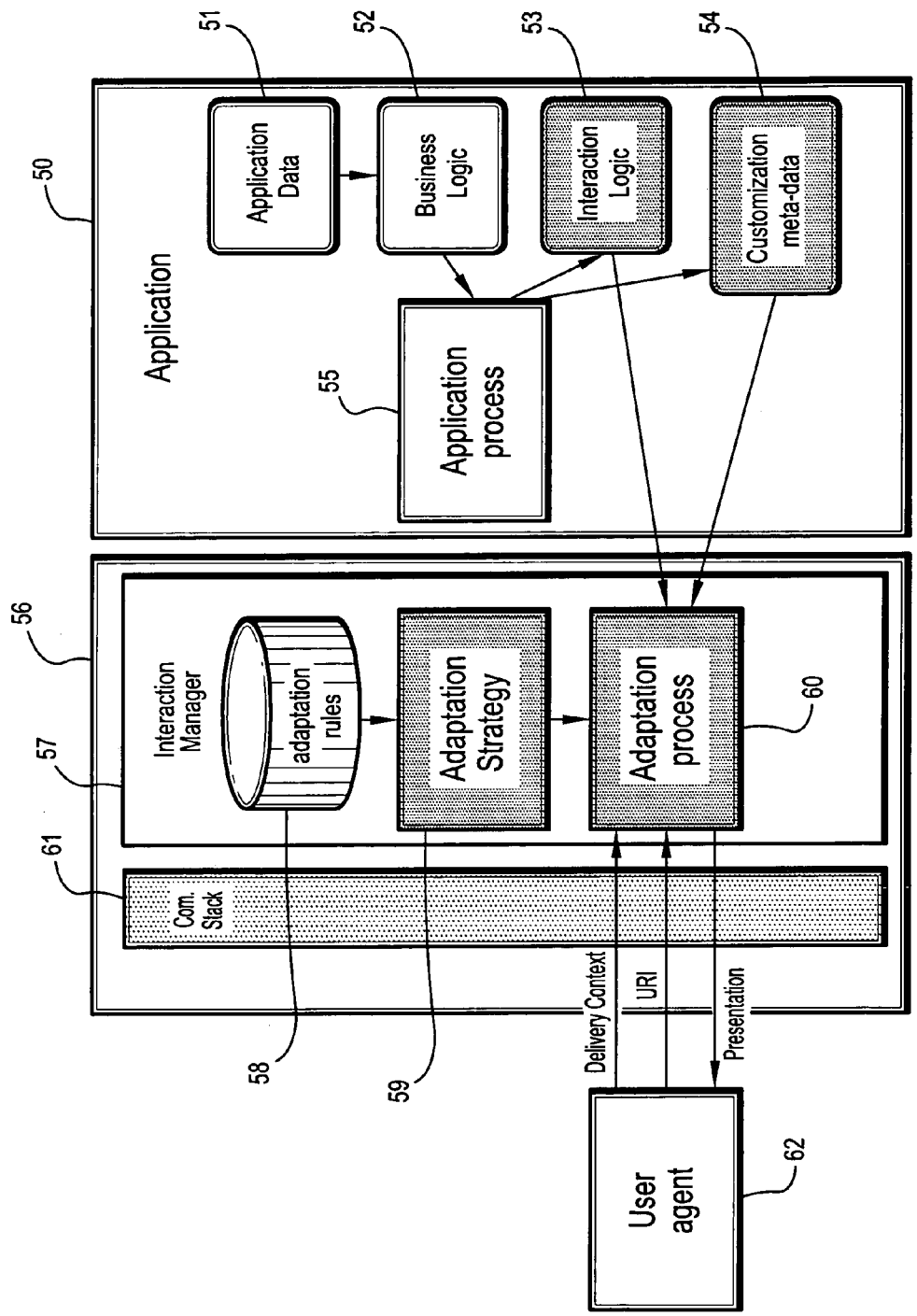
FIG. 5 is a diagram illustrating a interaction logic framework according to an embodiment of the present invention.

FIG. 5 is a diagram of a run-time view of an interaction-based application framework according to an embodiment of the present invention. FIG. 5 illustrates the factorization of the programming model into (i) data content authoring; (ii) business logic authoring; (iii) interaction logic authoring; and (iv) customization meta-data authoring. In FIG. 5, a application 50 comprises an application data layer 51, a business logic layer 52, an interaction logic layer 53 a customization layer 54, and application process 55. The application data layer 51 comprises data content, file services and databases, and comprises all of the backend information needed by the business logic 52 to run from one state to another state.

The business logic layer 52 (or "application layer") comprises the logic to transform the information collected from the user into a complex query and management of the database queries to execute the user's transaction request(s). For example, it is in the business logic layer 52 wherein a user's request for flight information is processed and a list of matching flights can be provided after consulting databases. The business logic layer 52 is used for data retrieval and computations. It may run on a shared host and therefore it is often available to multiple applications. Implementations of this layer include message servers, transaction processing monitors and application servers.

The interaction logic layer 53 comprises an abstract description of an application that describes how a user can interact with the application. The interaction logic layer 53 comprises a description of (i) available interaction: input, output, selection, etc., associated abstract event handlers and meta-information needed to enable the interaction (e.g. associated grammar files for speech, handwritten or typed input); (ii) flow of the interaction: navigation, grouping of interaction elements, etc.; and (iii) data model manipulated by the user: what is accessed, populated or selected by the interaction—the data that is presented to the user and the information that the user must provide to the application. The data model may also comprise some validation capability that directly affects the interaction.

The customization layer 54 comprises meta-data associated with the interaction logic layer 53 to optimize the presentation that will be generated by an adaptation process 60 for that particular delivery context. Customization may affect (i) the navigation flow; (ii) layout and cosmetic aspects; (iii) interaction logic (some elements can be added, remove or replaced); (iv) data model (e.g. changing the welcoming title from a long title on a large screen device, to a shorter title on a small screen device and a pleasant audio prompt for speech access.); or (v) adaptation rules 58 (modified, expanded or overwritten).

The framework of FIG. 5 further comprises an interaction server 56 comprising an interaction manager 57 and communication stack 61. The interaction manager 57 comprises adaptation rules 58, adaptation strategies 59 and an adaptation process 60, which are used for generating a presentation layer comprising data that is sent to a user agent 62 for rendering a user interface. More specifically, the interaction manager 57 receives the interaction logic layer 53 and the customization meta-data 54 and generates functional or customized presentations for a particular delivery context that describes the characteristics of the access mechanisms (channels). Functional presentation comprises presentation markup that is sufficient to allow a user in a given delivery context to complete a function intended by the author and customized presentation comprises presentation markup that is well enough adapted to a given delivery context to meet the quality criteria of the author. It is to be appreciated that rendering of the presentation in the user agent 62 may be affected by additional settings of the user agents that are not reflected in the delivery context or that are not taken into account by the adaptation process.

Figure 6:
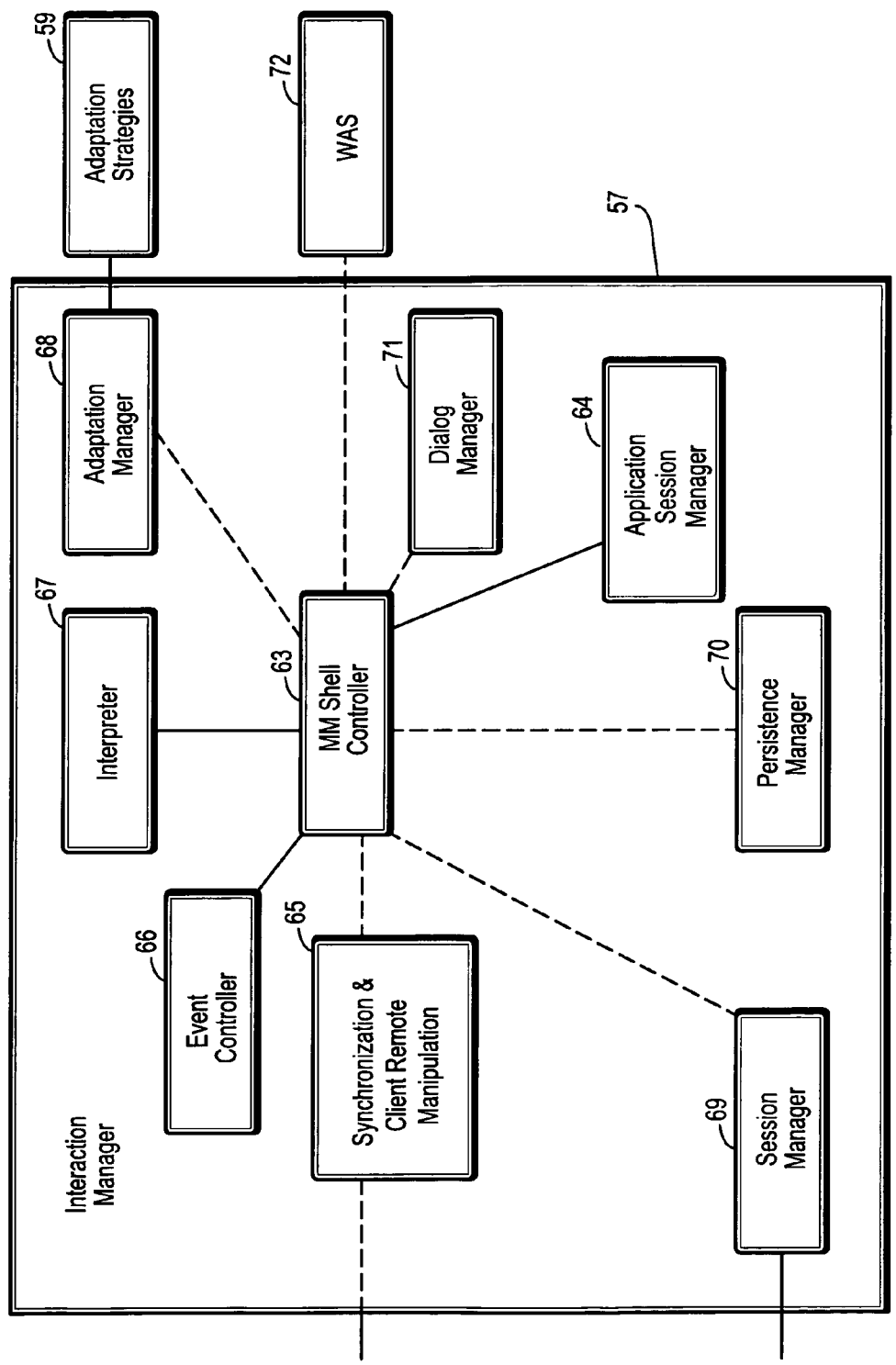
FIG. 6 is a diagram illustrating an interaction manager according to an embodiment of the present invention.

Referring now to FIG. 6, a block diagram illustrates an architecture of the interaction manager 57 according to an embodiment of the present invention. For server-side applications, the interaction manager 57 is preferably implemented as a servlet or Web intermediary plug-in. A multi-modal shell controller 63 controls the different components of the interaction manager 57 and comprises a hub for most of the functions. An application session manager 64 maintains for each session and application the complete state and history of the application, including the data model instances, interaction instances as well as an application, user and focus history. A synchronisation and remote client manipulation module 65 enables exchange of events from the different registered channels and to update different channels. An event controller 66 is responsible for handling any incoming event. An interpreter 67 transforms an incoming description of the applications into classes and event handlers.

An adaptation manager 68 generates the presentation pages for each channel. When based on XSL transformation, the strategy can use a transcending engine. As content adaptation strategies 59 are developed, they can be supported by implementing the interface to the content adaptation manager 68. With multiple authoring, interaction-based authoring and other methodologies can easily be integrated within the proposed framework. Adaptation relies on channel profile based on the delivery context provided by a session manager 69.

The session manager 69 identifies sessions, channel profile (delivery context) and users and further comprises functions of a user manager and device/channel manager. A persistence manager 70 saves session states for immediate or later access through a same or different delivery context. A dialog manager 71 manages dialog.

In FIG. 6, the dotted lines indicate that the components that are linked could be distributed. For example, the adaptation manager 68 and strategy 59 could be directly implemented on (Web Application Server) WAS 72 and the synchronization manager 65 and session manager 69 could be implemented on a Web Edge Server. Preferred configurations will depend on the functionality that is expected to be supported and the characteristics of the network.

B. Internal Representation, Programming Model

A programming model according to a preferred embodiment of the present invention comprises various model components. One component of a programming model comprises a data model. The data model comprises a description of the data that is manipulated by the user and the system during the interaction. Another component in an interaction model that comprises a description of the nature of interaction that proceeds between the user and system.

Preferably, the interaction model comprises the following entities:

(i) interaction elements, which comprise abstract units of user interaction bound to the data model and associated to events that accordingly update the data model;

(ii) dialogs/tasks, which comprise constructs that group interaction elements;

(iii) navigation, which specify possible paths of user interaction. Preferably, navigation is defined between dialogs/tasks and between the elements within a single dialog/task, but not between an element in one dialog/task and an element in another dialog/task. Further, simultaneous activation of multiple dialogs/tasks is preferably supported;

(iv) events, which comprise system or user generated actions that can result in manipulation of the data model, traversal of navigational paths, and change in interaction focus;

(v) meta-information, which comprises extra information provided by developers for use by the system to customize applications to particular channels. Examples include channel specific presentation information (e.g., overrides of the default rendering of interaction elements, layout and appearance directives, navigation directives), augmentation of interaction element and other components as mandatory, optional or forbidden for each supported target channel or class of channels, and application-level overrides (e.g., for affecting the generated navigation among generated screens, affecting the generated layout policy within screens, etc).

There are other preferred characteristics and features for an internal representation of a programming model according to the present invention. For instance, the internal representation is preferably based on a description of the interaction logic and relies on factorization of data model from interaction description. Further, the internal representation supports generation of functional presentation for any delivery context provided that associated transformation rules are provided (preferably based on transformation rules that are independent of the application business logic) and supports customization for different target channels. Moreover, an internal representation relies on inter-exchangeable representations of the interaction logic that: (i) are XML-based; (ii) are standard-based (preferably fits the W3C XML stack); (iii) are capable of being deployed on different platforms, including on client (e.g. fat client configurations of multi-modal browsers), (iv) fit the execution model of the interaction server; (v) can be mapped using style sheets (or other transformation mechanisms) to an open-ended set of device specific markups including VoiceXML, WML, CHTML, HTML and others, to provide at least functional presentation for any delivery context provided that the associated stylesheets are available and to provide customized presentations for supported/targeted delivery context; and (vi) can express customization through stylesheet specialization, annotations, and portions of presentation specific to the target channel. The internal representation can be implemented with imperative components and/or script. It is not limited to XML/declarative specifications.

Further, the internal representation preferably allows integration/authoring and customization with existing development tools familiar to applications developers that creates and update the internal representation. In addition, the internal representation is preferably extensible to (i) support authoring of multi-modal, multi-device and free-flow (conversational) applications, and (ii) allow new interaction or presentation model abstractions and new delivery context with only the requirement to author new adaptation rules targeted at the delivery context. Moreover, the internal representation preferably supports dynamic and efficient transformation of the interaction logic and customization meta-data into the different target presentations In a preferred embodiment, a programming framework: (i) factors the data model and interaction; (ii) expresses the data model with XForms; (iii) expresses the interaction with the abstract modules for XForms UI and following the principles of iML (using iML/XForms construct or XHTML constructs); (iv) expresses events following the XML event model; (v) expresses transformation rules via reusable XSL.; and (vi) expresses customization via inline (or pointed) annotations and XSL transformation specialization.

For scalability and efficiency, it is preferred that the internal representation supports JSP with a mechanism to pre-compile the transformation rules, for example, by relying on beans that generate presentation fragments.

We recommend implementation of a multi-channel IDE that support the above-outlined programming model, in conjunction with existing tools and existing multi-channel methodologies (XML/XSL, JSPs, servlets, annotations, etc.). To accelerate the authoring of multi-modal and multi-device application, independently of the adoption of any new programming model, we recommend the creation of a multi-modal IDE that support authoring by naming convention and possibly support other methods such as synchronization tags, command and control and merged files.

C. Programming Tools

In a preferred embodiment, programming tools comprise a MVC IDE where user can develop with conventional channel specific tools and visualize the effect in multiple channel, possible synchronized). Authoring tools according to the present invention should be integrated with and support multi-channel tools (XML/XSL, JSPs, Servlets, struts, web services components with UI, Annotation editor). Authoring Tools preferably support an interaction-based programming model as described above. Authoring tools should support functional adaptation and presentation customization for multi-channel, multi-modal (across a wide range of synchronization level from sequential to page, slot and event/simultaneous level), multi-device (across a wide range of synchronization level from sequential to page, slot and event/simultaneous level), free flow authoring, and other features or option of application written for the interaction manager.

Further, authoring tools according to the present invention preferably support other multi-modal/multi-device authoring (naming conventions, etc.) and capability to handle legacy applications and appropriately convert them to an interaction-based format.

Furthermore, authoring tools according to the present invention preferably support media adaptation. In particular, when media (audio, video, pictures) are included in a presentation layer, the tool preferably allow conversion of media from one type to another to enable presentation through the device (e.g. MPEG to AVI to a sequence of JPEG at regular interval, PNG or Gif, etc.) When authoring for a channel where it can not be presented, an alternative should be available (e.g. caption that explains what the media would have illustrated or a page that explains how to interact or what to do to try to access the media).

Figure 7:
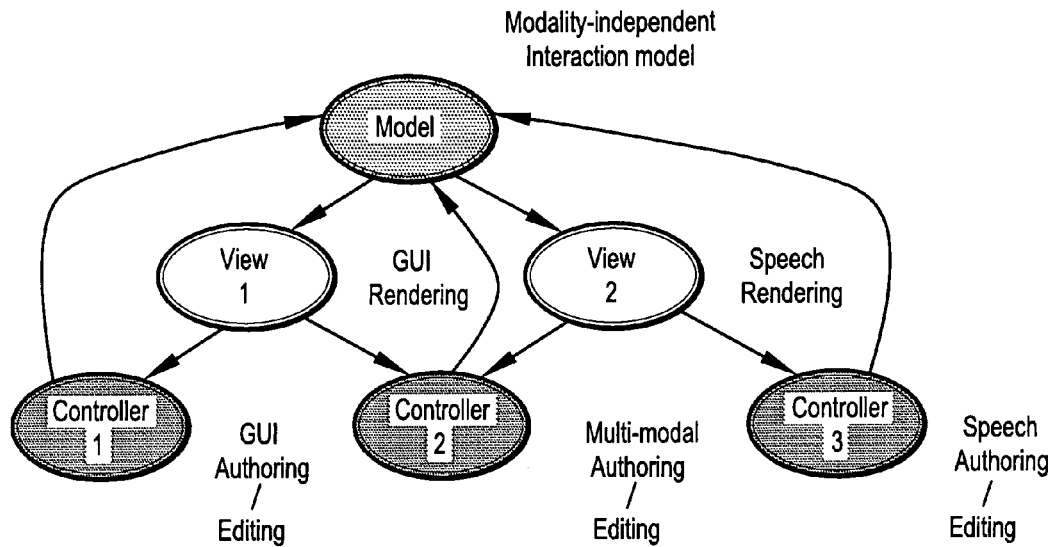
FIG. 7 is an exemplary diagram of a system for developing an application according to an embodiment of the present invention.

FIG. 7 illustrates a MVC-based editor/IDE development tool according to one aspect of the present invention. In the exemplary development environment of FIG. 7, the editing of an application can be performed directly at the level of single authoring such as by assembling and editing modality independent conversational gestures (e.g., iML (interaction markup language) as described above, and data structure components (e.g., XFORMS). An application can be built using a WYSIWYG (what you see is what you get) editor mode in GUI modality (HTML or WML) or in speech modality (WYSIWYG tools for VoiceXML or direct "listen what you created" tools.

In general, an authoring approach according to one aspect of the invention is as follows. Every action in a given channel immediately results into an update of the common/ modality independent version of the application, that is, the Model of the MVC architecture, wherein the Model comprises the interaction logic plus the customization meta-data layer (e.g., the iML/XFORMS as described above). These actions can be communicated in different manners. Preferably, a DOM interface is placed between the view and the model wizard to track all the author actions (as they are tracked between views and multi-modal shell when tracking the user action at runtime). Further, any update is immediately reflected in the Model (interaction logic and customization met-data layer). Accordingly, whenever the application developer edits a View (i.e. a modality), the impact, as interpreted by the editor is displayed in a Model view. Any ambiguity is signaled to the developer so that the developer can resolve the ambiguity. The developer can modify the editor's decision and further define/parameterize the gestures (by clicking in the Model view on the object).

Each View can be edited "conventionally". In other words, HTML can use conventional WYSIWYG editing, source editing, symbolic editing (i.e. boxes and icons such as Visual Basic), such as FrontPage, HotMetal Pro, Macromedia editors, Object Fusion etc. A WYSIWYG editor allows a developer to create a GUI interface or page of text so that the developer can see what the end result will look like while the interface or document is being developed. Further, modality-specific interaction elements/gestures/tree branches and customized elements are flagged by the application developer in the modality where it is not seen/absent. The developer can see the impact on other modalities of these specialized items simply by reverting the flag. Alternatively, and preferably, direct editing of the interaction logic layer and customization meta-data layer can be done in source or symbolically (i.e. such as with Visual Basic by positioning symbols or widgets that characterize the figure and completing any associated parameters.

A development environment according to a preferred embodiment of the present invention, as illustrated in FIG. 7, comprises an Model (interaction logic and customization meta-data layer) editor that comprises the following features and/or operates based on the following principles. A model editor preferably comprises a graphical editor (multiple for different GUI/visual channels) for the GUI component of multi-modal interfaces. The developer edits the interface one mode at a time, using a mode-specific editor for each mode (HTML, XHTML, XHTML-MP, WML, CHTML, VoiceXML, etc).

Further, the developer can specify and update the set of modes supported by the application at any time, for example using a wizard. The developer can switch between mode-specific editors at any time, for example by clicking on an icon associated with a given mode. Rendering for modality-specific channels is provided using corresponding conventional legacy browsers. On the other hand, multi-modal rendering preferably involves a multi-modal browser, such as MVC DOM based architecture that enables direct re-use of the channel/modality specific views and WYSIWYG editors. The author's actions are reflected to the model through the DOM interface that then launches the wizard when ambiguous. Wizard selection by the user will update the different view/editors (depending if the last action was on the interaction logic or a channel specific customization).

For GUI modes (such as HTML, WML and CHTML), the mode-specific editor may comprise a WYSIWYG editor that includes a simulation of a typical device. For voice modes (such as VoiceXML), the mode-specific editor may comprise a symbolic display of the prompts and active vocabularies (e.g. IVR scripting tools). Each mode-specific editor generates the corresponding mode-specific ML representation through transformation of the Model (i.e., interaction logic and customization meta-data layer page (e.g., iML page)).

The editor automatically generates an interaction logic and customization meta-data (e.g., iML) representation from the mode-specific ML representation generated by the editor. This mapping is sometimes non-deterministic. The editor makes its best guess based on available information. The editor automatically generates mode-specific ML representations from the interaction logic and customization meta-data representation for all modes supported by the application. The developer can access, edit and visualize the interaction logic and customization meta-data representation at any time, for example using a window that displays the interaction logic and customization meta-data representation (DOM, text or symbolic). This window preferably highlights fragments of the interaction logic and customization meta-data layer that were non-deterministically chosen by the editor. The user can easily change the choice of the interaction logic and customization meta-data layer made by the editor, for example by clicking on the fragment of ML and going through a wizard.

Further, the user can specify in each View the components that are not visible (i.e. not present in that View), by checking a flag. This is an example of customization.

As existing editors and viewers or device specific emulators can be used, provided that they have the right interface, editors can be developed and added as plug-in (or through a DOM interface connection) for the editors specific to a given channels and the viewers/emulators.

It is to be appreciated that even if using an intermediate internal interaction logic layer common across modalities, the authoring tool of FIG. 7 may generate files as if they were authored using a multiple authoring approach. Similarly for a particular channel, the tool may generate the final form representation obtained by adapting the interaction layer and customization information for that delivery context. The tool can be used to generate a representation for a particular channel (functional and customized presentations) and multi-modal applications that appear as applications authored by multiple authoring methods with one of the method described herein (merged file, synchronization tags, naming conventions, Voice module etc.).

Note that all these tool principles can be extended to imperative programming, scripts or hybrid (i.e. declarative and imperative/procedural).

A multiple authoring approach (as described above) and associated renderers are also supported. Modality/views can be edited separately in each modality editor. Each page has its associated model (interaction logic and customization meta-data layer). Synchronization (tag based) is readily visualised and modified by merging/importing the interaction logic and customization meta-data pages and deciding what part goes where. The interaction logic and customization meta-data pages are thereafter disregarded and only the multiple legacy pages with the added tags are kept for serving to the browser. There is of course value to also keep the interaction logic and customization meta-data pages for multi-modal browsers or multi-device browsers.

This amounts to building a pseudo DOM representation of the application where the pseudo gestures are defined as above: gestures are the blocks in each modality that are synchronized with one another and therefore fully defined by the authored application.

New renderers are supported by "plug-in" of the editor, renderer (emulator) and transformation rules. The plug-in can be done through a particular proprietary interface or through a DOM interface. XSL (or other) transformations are easily edited and checked on the interaction logic and customization meta-data page (e.g., iML page) for the target modality. Instead of changing the transformation rules, it is possible to overwrite portions of the resulting adapted presentation. These portions can be classified and maintained as candidate customization pattern that the application developer can examine when customizing a similar iML pattern later in the application. Other transformation rules such as JSP, Servlets, Beans, etc., can also be supported. Conversational applications are covered, for example via parallel activation of forms (Y0999-478). They can be edited similarly but now require a supporting dialog manager.

Figure 8:
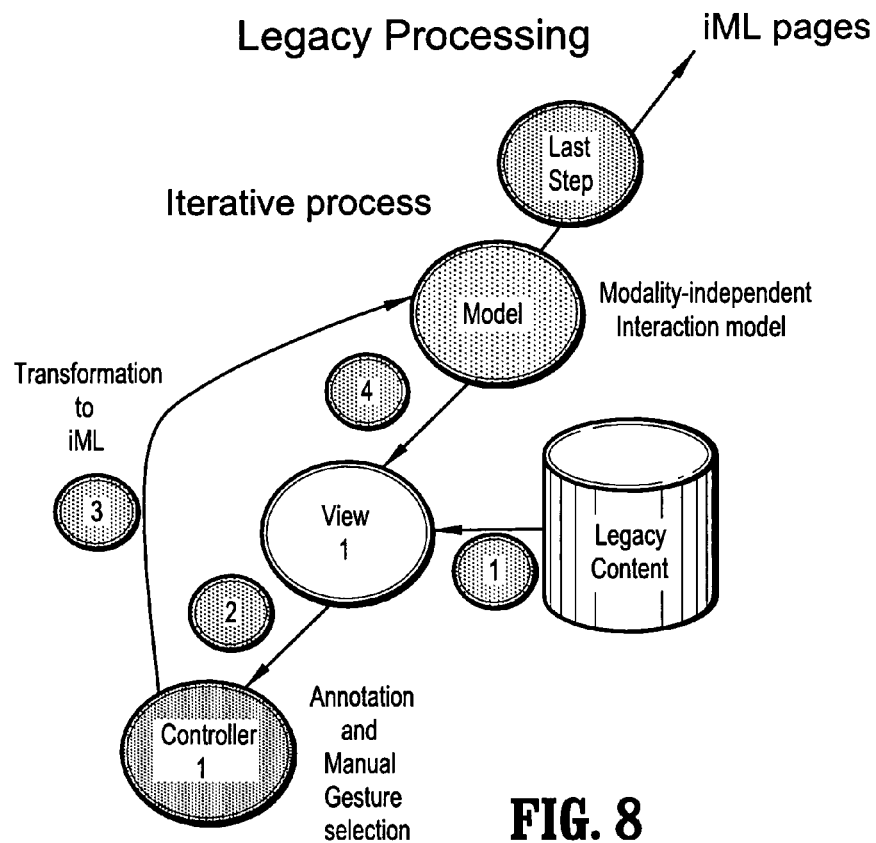
FIG. 8 is a diagram of a method for converting a legacy application to an application based on a single authoring paradigm, according to one aspect of the present invention.

FIG. 8 is a diagram that illustrates a method for converting a legacy application to a single authoring programming framework (such as the interaction logic and customization meta-data layer), according to one aspect of the present invention. Legacy applications are defined as applications that have been developed for a specific channel only (mono-channel applications). An objective is to support conversion of the application from its current channel specific format to the interaction logic and customization meta-data layer described above. In a preferred embodiment, a modality-specific application is converted to an iML format. Referring now to FIG. 6, legacy content is viewed in the corresponding renderer (step 1). This results into an immediate mapping to iML (step 2 and 3). Even at the first step, the mapping will be sequential, one gesture or pseudo-gesture at a time with each time a request for confirmation or correction to the user. When the user makes a correction, it modifies the mapping accordingly. As a result, the iML page or application can be re-examined in the same view (step 4) or in other views of interest according to the process described earlier.

For customization, the discussion here assumes that customization results into modifying the interaction logic (iML/XForms) and that this then may be reflected or rejected for other channels. It is in fact possible to consider the case where the customization is directed at applying a transformation that goes from the current presentation to a customized presentation by specializing a transformation from presentation to presentation, instead of modifying the interaction logic or the transformation rules that go from the interaction logic to the customized presentation.

Furthermore, as mentioned above, customization may be achieved by adding explicit events in the interaction logic layer. These events can be used to customize:

(i) Navigation: when an event is fired (e.g., reaching a given point in a given view or in the interaction logic layer), an event handler can decide to change the focus (e.g., by filing portions of the data model, changing the presentation, etc.);

(ii) Synchronization: when an event is fired (in a view or in the interaction logic), it results into an update in the data model and other views. By programming the way that the other views are updated and the way that the data model is updated, we can also change the "synchronization" default behavior of the multi-modal shell.

In addition, the synchronization between browsers can be extended to synchronization of components other than pages. Such components can include, e.g., web services or portlets or page fragments combined by an aggregator (located on client, in network or on server). The MVC Editor tool can be used the same way to author and check the coordination between the components.

Figure 9:
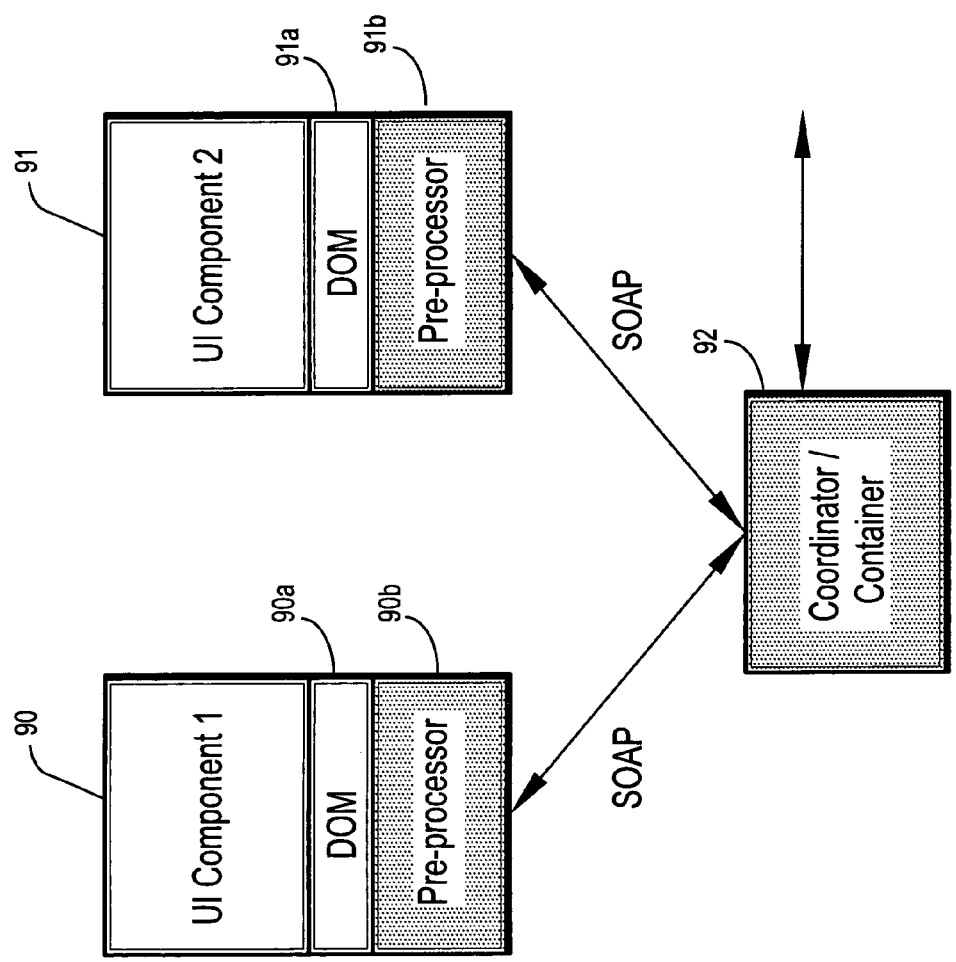
FIG. 9 is a diagram of a system and method for providing coordination between user interface components according to an embodiment of the present invention.

FIG. 9 is a diagram of a system and method for providing coordination between components (these can be web services with a UI or portlets) according to an embodiment of the present invention. In the embodiment of FIG. 9, a plurality of UI (user interface) components 90, 91 are coordinated through a coordinator/container 92 using a DOM-based MVC architecture (such as described in U.S. patent application Ser. No. 60/251,085, filed on Dec. 4, 2001, (Express Mail No. EL797416042US), which is commonly assigned an incorporated herein by reference. The different interaction components 91, 92 register with the container 92 and the contact between the container 92 and components 90, 91 is programmed in the container 92. The preprocessors 90b, 91b and container 92 can be programmed via events, XLINK and XForms. The preprocessor wrappers 90b, 91b are programmed to specify what component-specific processing can be performed on the events coming from each associated component 90, 91, and on the updates coming from the container 92. The flow of events that follows a particular user interaction matches the flow described in the above incorporated application 60/251,085. The nature of the coordination performed by the container 92 depends on what is specified with event handlers. The tool now allows edition of the components and programming of the model (container) via a event/XML editor and simulation via synchronization the components.

UTI components 90, 91 can also control what is affected by the container 92 and how it is affected. This is specified in terms of the code loaded in the different UI component DOM wrappers 90a, 91a (event handlers). UI components 90, 91 can share context, defined as a data structure that encompass data model instance, interaction instance and other interaction history (focus, etc . . . ). Examples supported by this solution include, for example, context sharing among reusable voice dialog component, focus/priority/layout change between the cascaded windows of widgets, and coordination and interoperability between multiple interaction components (e.g. dialog management across multiple voice application).

V. E-Business Example

The following example illustrates the advantages of authoring WWW content such as e-commerce applications in a modality-independent single authoring representation, as compared to an alternative approach of transcending content designed for a specific deployment environment, e.g., HTML pages authored for a desktop GUI browser to other modality-specific languages such as VoiceXML or WML. These advantages are made explicit in the following example by identifying specific e-commerce scenarios that our approach enables. In the following example, the company names (Bookstore.com and eStore.com) have been selected to be fictitious. It is not the intention to use anybody's registered trademark and these are not to our knowledge used names or registered trademarks.

Consider the following end-user deployment scenario. Bookstore.com would like to allow its customers to shop whenever, where ever and how ever the customer finds most convenient. This is because by analyzing its current web site traffic, Bookstore.com, which is an electronic store with a well-designed shop front optimized for desktop GUI browsers, has discovered that often, customers use the online catalog to locate books of interest; however, not all such searches conclude in a book sale. Further, Bookstore.com has discovered that a few of these incomplete transactions lead to a sale at their traditional bricks and mortar store. BookStore.com now feels that many more of these incomplete transactions could be turned into completed sales if the end user could continue his interrupted transaction using devices such as cell phones. The company has therefore decided to deploy its electronic shop front to a multiplicity of end-user access devices, including handheld computers and cell-phones.

BookStore.com has a significant investment in its current electronic storefront that consists of HTML pages for creating the visual interface and server-side logic for implementing the business backend. BookStore.com decides to directly leverage this significant ongoing investment in maintaining and updating the visual HTML storefront by contracting out for a transcoder that will translate HTML GUI pages for serving to WML and VoiceXML browsers.

After this new service is deployed, Bookstore.com finds that the customer experience leaves a lot to be desired. End-users complain that though the HTML translations to WML display on their handheld devices or can be access by voice through a VoiceXML browser, the resulting interface and user experience leaves a lot to be desired. This is because the user interface dialogues that result from translating the pages are sub-optimal for the modality being used; for instance, a search for books by Isaac Asimov using the desktop GUI browser produces a long scrollable list that the user can quickly skim—thanks to the large visual display; however, when using the WML browser on a handheld, the list is cumbersome to use. Worse, when interacting with this same dialog over the telephone, the long list is useless because it takes too long to play.

BookStore.com passes this end-user feedback to the authors of the transcending service who now begin a costly optimization project. As a consequence, many of the WML and VoiceXML pages are now hand-tuned to work around the end-user problems. This hand-tuning is necessary because the WYSIWYG HTML pages that the content creators at Bookstore.com capture the visual appearance—and not the underlying meaning—of the various transactions offered by the store. Additionally, it is found that many dialogues that can be presented as a single HTML page in the desktop browser need to be split up into multiple dialogues for the other environments; this introduces the need for new server-side logic that is specific to the WML and VoiceXML clients. Finally, the creators of the WML and VoiceXML representations complained after a few months that their pages were breaking because they were not being informed when the WYSIWYG pages got updated. After much wrangling and debate, Bookstore.com management has now introduced a rigorous process for updating content on its storefront—this is to ensure that all versions of its storefront get a chance to be updated synchronously.

This has now reduced some of the earlier friction; however, Bookstore.com now discovers that its site—once known as one of the most up-to-date bookstores—is now beginning to gain a reputation for being at least six months out of date. It's being quickly outpaced by the competition. In addition, as this process evolves, Bookstore.com finds that in addition to its ongoing investment in maintaining the visual storefront, considerable resources are now spent in keeping the hand-tuned transcodings in sync with the electronic store. Additionally, Bookstore.com also finds that it needs to maintain and update portions of the server-side business backend that are specific to one or other mode of interaction. Finally, Bookstore.com finds its cost of maintaining the HTML storefront going up in order to keep pace with the evolving WWW standards and WWW browser features.

While Bookstore.com loses ground, an innovative company named eStore.com has quickly gained ground as the electronic store that provides round the clock ubiquitous shopping. EStore.com storefront is always up-to-date—both in terms of content, as well as in its ability to keep pace with the newest WWW browser features and WWW standards. Recently, when a new handheld browser platform for viewing pages conforming to a newly announced standard was introduced, the competition at bookstore.com was amazed to see its rival eStore.com prominently featured on all the portal sites for the new browser.

The reason is as follows. The engineers at eStore.com had been involved with WWW technology since its inception and had realized that keeping up with the rapid pace of development required creating and maintaining content in a high-level representation that could be translated to the newest standards as they became available. During the infamous WWW browser wars, they had leveraged this ability to serve multiple WWW browsers. As speech technologies became more available, the engineering team at eStore.com realized the potential presented by speech in turning their electronic store into one that was available from a multiplicity of access devices. They participated closely in the definition of specialized languages such as VoiceXML and WML—which they viewed as final form representations for the forthcoming handheld devices in the same vein as HTML was a final form representation for delivering the electronic store to GUI browsers.

Given eStore.com overall architecture of representing their web site as a collection of XML-based pages that were appropriately served to different clients, the engineering team was well positioned to take the next step in designing a high-level XML based language that aimed to separate form, content and interaction. Whilst the competition continued to spend resources in authoring modality-specific visual HTML—and subsequently even more resources in translating these to other modality-specific representations such as VoiceXML and WML, eStore.com moved rapidly towards adopting our single authoring markup language for encoding the user interaction logic of their store, and transcended this representation to legacy browsers.

Since the new proposed markup language representation captured interaction logic—rather than the visual appearance of various user interface dialogues—, optimized versions of the electronic storefront could be delivered to multiple devices. This was because the transcending to VoiceXML or WML could exploit the semantic information present in the new ML to tune the shape of the user interface dialogues. This is one of the most significant advantages of the new markup language over the more pedestrian approach of transcending HTML directly. Given this advantage, eStore.com was able to deploy a small engineering team to transcode the new ML page to any of the many desired final-form representations such as VoiceXML.

Further, as customers flocked to the eStore.com site, they asked for more innovative features such as the ability to interact with the site using multiple modalities in parallel, especially now that new 3G Voice/WAP devices are being released. The engineering team at eStore.com spotted the potential benefits and designed a multi-modal browser that allowed multi-modal interaction where the user interface dialogues in the various modalities were tightly synchronized. This was possible to do because the various modality-specific UI dialogues were being generated from a single representation; and rendered using a single model; as a consequence, the multiple user interfaces e.g., GUI, speech, etc. could be synchronized and continuously updated as user interaction proceeded with one modality or another. With such an interface, users could to switch modality at any time and seamlessly continue the ongoing transaction. eStore.com is now considered a textbook example of a successful e-business born on the "Next Web".

Although illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. An application development system, comprising:
    a computing system comprising means for storing and executing an application development tool, wherein the application development tool comprises:
        a plurality of modality-specific editors for generating one or more modality specific representations of an application, which comprise means for flagging a component of a modality-specific representation to indicate that the interaction associated with the component is not synchronized across other modality-specific views;

a model generator for generating a modality-independent representation from a modality-specific representation and for generating a modality-specific representation from the modality-independent representation; and a plurality of rendering units for rendering corresponding modality-specific representations for view by a user; and a user interface system to enable user interaction with the tool and to present modality specific and modality independent representations of an application to a user while building the application using the tool.

2. The system of claim 1, wherein the rendering units comprise browsers.

3. The system of claim 1, wherein at least one modality-specific editor comprises a WYSIWYG (what you see is what you get) editor.

4. The system of claim 1, wherein the user interface system comprises a display for displaying a view of the modality-independent and modality specific representations.

5. The system of claim 4, wherein a portion of the displayed modality-independent representation is highlighted to indicate that the portion was non-deterministically selected by the tool based on a modality-specific representation.

6. The system of claim 1, wherein a modification in a modality-specific representation is automatically reflected in the modality-independent representation and at least one other modality-specific representation.

7. The system of claim 1, wherein each modality-specific editor comprises a plug-in.

8. The system of claim 1, wherein the tool supports a single authoring programming model.

9. The system of claim 8, wherein the single authoring programming model comprises an interaction-based programming model.

10. The system of claim 9, wherein the interaction-based programming model comprises an interaction model to describe user interaction with the application and a data model to describe data that is manipulated during the interaction.

11. The system of claim 10, wherein the interaction-based programming model further comprises meta-information for customizing the application to one or more particular channels.

12. The system of claim 1, wherein the tool supports a multiple authoring programming model.

13. The system of claim 12, wherein the multiple authoring programming model comprises a plurality of channel-specific snippets for each of a plurality of modalities that are synchronized with each other.

14. The system of claim 13, wherein the synchronization between channel-specific interaction components are expressed by events in one channel-specific snippet that triggers an event handler in another channel-specific snippet.

* * * * *